United States Patent [19]

Steudtner

[11] Patent Number: 5,160,694
[45] Date of Patent: Nov. 3, 1992

[54] FUSION REACTOR

[76] Inventor: Werner Steudtner, Lindenhof 5, CH-8604 Hegnau bei Zürich, Switzerland

[21] Appl. No.: 633,961

[22] Filed: Dec. 26, 1990

[30] Foreign Application Priority Data

Jan. 22, 1990 [CH] Switzerland ............... 00213/90

[51] Int. Cl.⁵ .................................... G21B 1/02
[52] U.S. Cl. ...................... 376/107; 376/146
[58] Field of Search ............... 376/107, 146, 144

[56] References Cited

U.S. PATENT DOCUMENTS

| | | | |
|---|---|---|---|
| 3,155,592 | 11/1964 | Hansen et al. | 376/107 |
| 3,258,402 | 6/1966 | Farnsworth | 376/107 |
| 3,533,910 | 10/1970 | Hirsch | 376/107 |
| 4,189,346 | 2/1980 | Jarnagin | 376/107 |
| 4,202,725 | 5/1980 | Jarnagin | 376/107 |
| 4,639,348 | 1/1987 | Jarnagin | 376/107 |
| 4,698,198 | 10/1987 | Gruen | 376/146 |
| 4,826,646 | 5/1989 | Bussard | 376/107 |
| 5,034,183 | 7/1991 | Blewett | 376/107 |

FOREIGN PATENT DOCUMENTS

884705 12/1961 United Kingdom ............... 376/107

OTHER PUBLICATIONS

Project Sherwood, pp. 68–71, 85–131, 139–147 and 188 (1954).
Certain pages from German language Encyclopedia "Der grosse Brockhaus", F. A. Brockhaus, Wiesbaden, Germany /a/ pp. 307–308 Fusionreaktor (fusion reactor) vol. 4, 1978, /b/ p. 298 INTOR (International Tokamac Reactor) vol. 14, 1982, /c/ p. 314 JET (planned European fusion reactor) vol. 14, 1982, /d/ pp. 252–253 Kernfusion (nuclear fusion) vol. 6, 1979, /e/ pp. 334–335 Kernfusion (nuclear fusion) vol. 14, 1982, /f/ pp. 406–407 Max Planck-Institut für Plasmaphysik (Max Planck Institute for plasma physics) vol. 14, 1982.

*Primary Examiner*—Daniel D. Wasil
*Attorney, Agent, or Firm*—Marmorek, Gutman & Rubenstein

[57] ABSTRACT

Fusion reactor (36) based on the cusped geometry concept in which the problem of indefinite tight plasma containment with inherent stability and high compression of the contained plasma in the reaction zone (19) is solved by an electric potential pot (22) surrounding the reaction zone and having an ion source (37) at the upper potential pot edge (38).

20 Claims, 3 Drawing Sheets

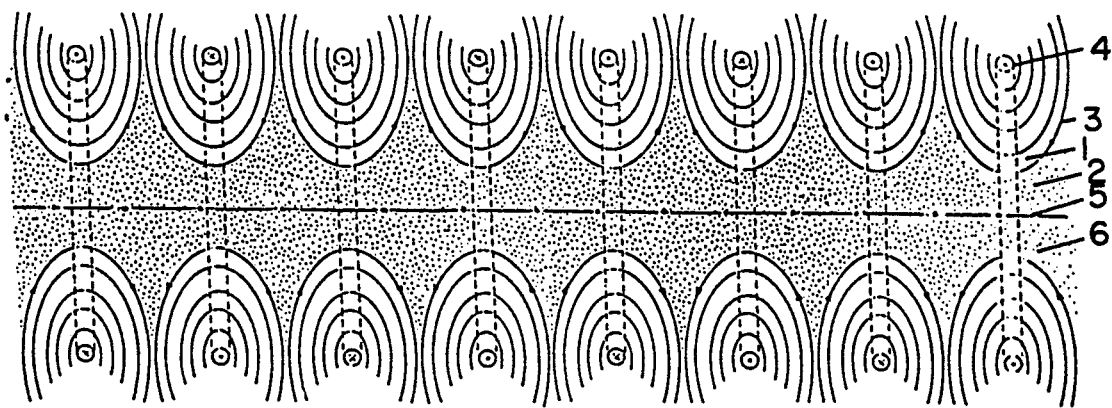
FIG. 1a (PRIOR ART)
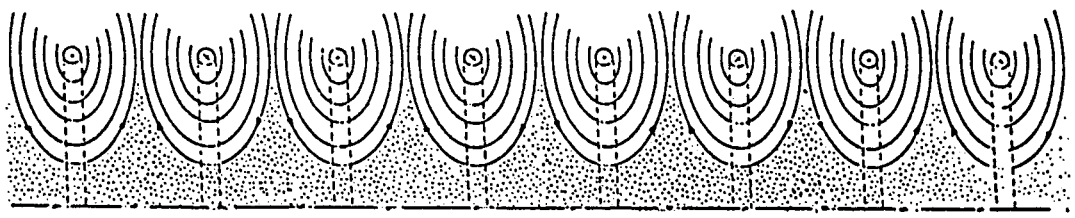
FIG. 1b
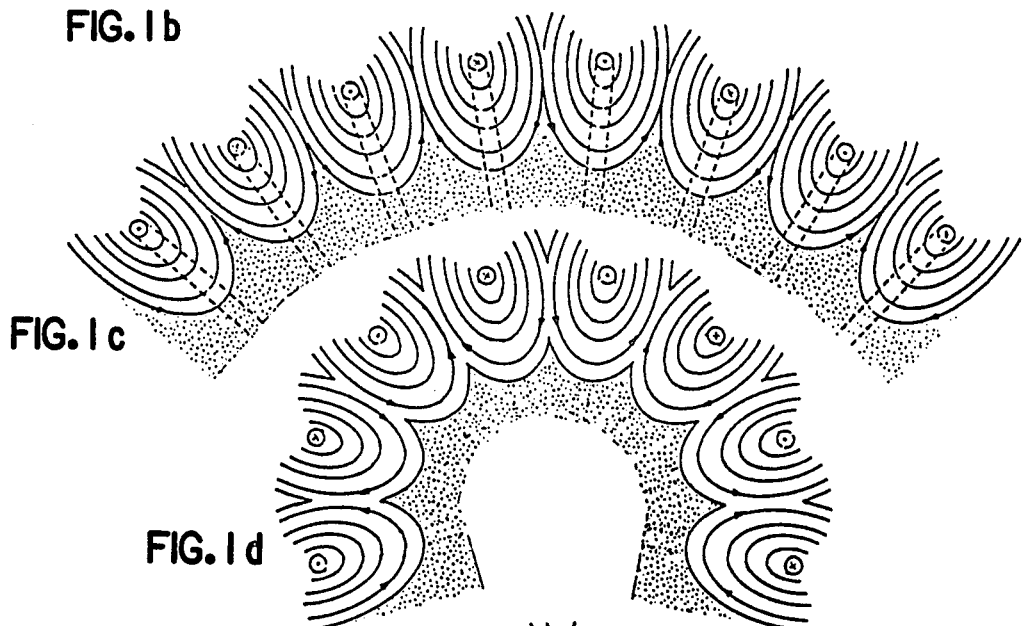
FIG. 1c
FIG. 1d
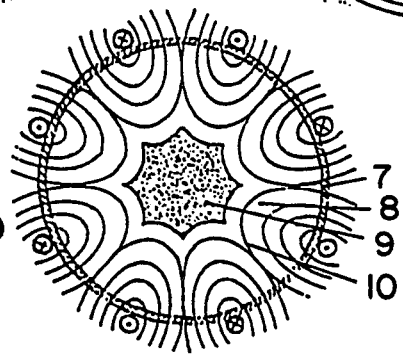
FIG. 1e
(PRIOR ART)

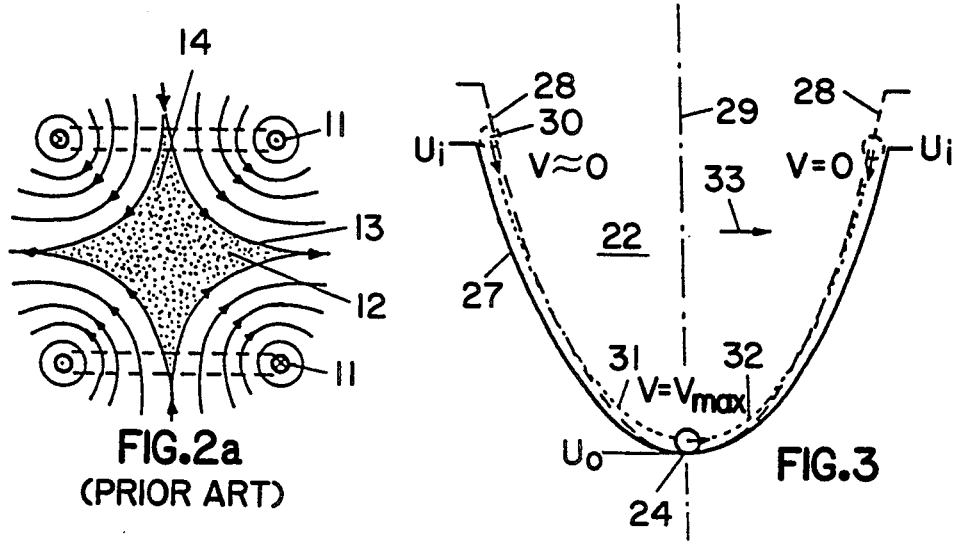
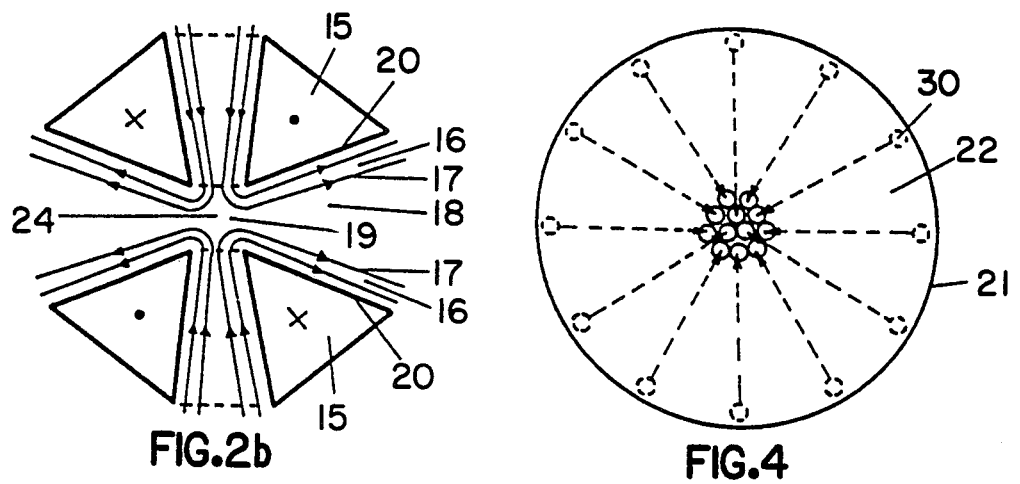
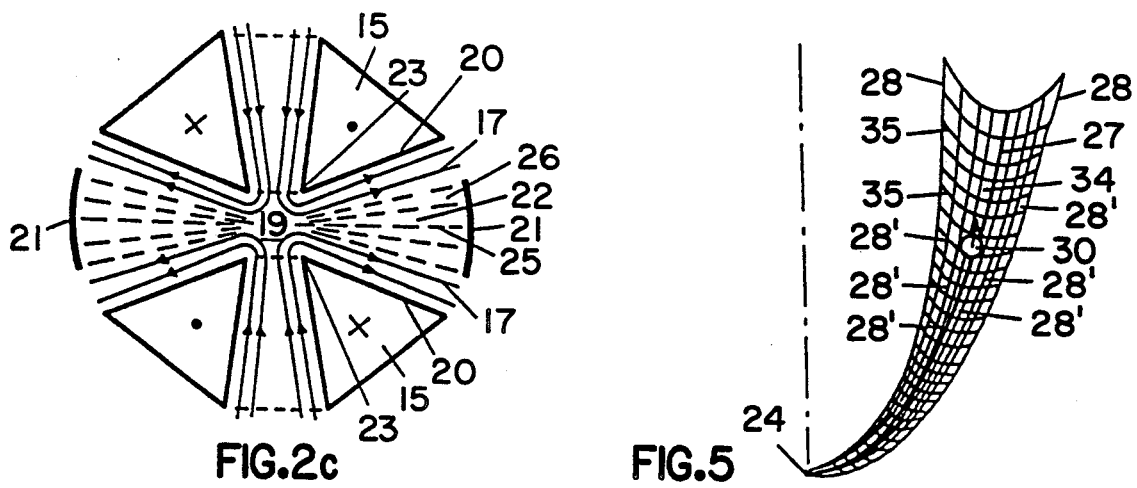

FUSION REACTOR

BACKGROUND OF THE INVENTION

The invention relates to a fusion reactor having a reaction zone surrounded by a magnetic field with magnetic flux lines which viewed from the reaction zone are curved in a convex manner.

THE PRIOR ART

Such a magnetic field, surrounding the reaction zone and having magnetic flux lines curved in a convex manner when viewed from the reaction zone, had already been proposed for controlled nuclear fusion by the doyen of nuclear fusion, Edward Teller, during the Sherwood Conference in Princeton U.S.A. in October 1954 because only with such a magnetic field is it possible to achieve stability during the containment—essential for eliminating contacts between reactants and material reactor parts in the vicinity of the reaction zone—of the high-energy reactants in the reaction zone ("Project Sherwood", Addison-Wesley Publishing Company Inc., Reading, Mass., U.S.A., by A. S. Bishop, p. 85-87).

At the same conference, J. L. Tuck put forward a proposal, which fulfilled E. Teller's stability criterion and became known as the "picket fence concept", for the basic construction of a fusion reactor of the type mentioned initially in which the magnetic field is generated by magnetic flux lines, which are curved in a convex manner towards the reaction zone, of several circulating currents which flow parallel to one another and axially apart from one another, each in the opposite current direction to the adjacent circulating current, about the same axis and surround the reaction zone or the plasma of high-energy reactants with the magnetic field they generate ("Project Sherwood", p. 86-89, in particular p. 89).

Teller's contribution to the 1954 Sherwood Conference led during the conference itself to an in-depth discussion of the stability problems of containing high-energy plasmas for, apart from the picket fence concept first submitted at this conference, there was not a single concept for a fusion reactor which met Teller's stability criterion, i.e. where the reaction zone was surrounded by a magnetic field with magnetic flux lines curved, when viewed from the reaction zone, in a convex manner, rather all the concepts put forward at that time and all the experimental reactors under development—and especially the various embodiments of the Stellarator and the so-called Mirror machines—were provided with a magnetic field with magnetic flux lines curved in a concave manner viewed from the reaction zone and were, according to Teller's stability criterion, unstable. Nevertheless, during this conference the hope still prevailed that instabilities owing to non-fulfilment of Teller's stability criterion would arise in the experimental reactors under development and especially in the Stellarator and the Mirror machines only at relatively high values of the ratio $\beta$ of plasma pressure to magnetic pressure upon the plasma and that non-fulfilment of Teller's stability criterion was not an effective barrier to continued development of these experimental reactors. In the ensuring period, however, theoretical studies conducted in particular by E. A. Frieman, H. Grad and C. L. Longmire have demonstrated that Teller's stability criterion is universally valid so that the Stellarator and the Mirror machines are unstable, and are so not only at high but also at low values of the ratio of plasma pressure to magnetic pressure upon the plasma ("Project Sherwood", p. 85-88).

Despite these findings, however, the Stellarator and Mirror programmes were continued ("Project Sherwood", p. 106-131), initially probably for the main reason that a great deal of money had already been invested in experimental reactors and there was a wish to use the, in some cases, almost completed experimental reactors at least to check out the, hitherto only theoretically predicted, instabilities by conducting practical stability tests.

But otherwise these findings led, not for example to a rethink in the development of fusion reactors on the basis of stable plasma containment as a priority, but on the contrary to a second series of pinch concepts (fast pinch, $B_z$-stabilized pinch, srew-dynamic pinch, triaxial pinch; "Project Sherwood", p. 90-105) aimed no longer at achieving stability but the fastest possible heating of the plasma to fusion temperatures within the period up to the occurrence of instabilities and the maximum extension of this period. However, because of the abandonment of stability, these concepts even if successful could at best have led to pulsed-mode operation fusion reactors and consequently to an adverse energy balance so that the actual aim of producing energy by nuclear fusion would have been no nearer achievement.

Whereas, even after the discovery that all the experimental reactors of the Stellarator, Mirror and Pinch programmes were unstable, practical testing was still carried out for an extended period both with earlier developed experimental reactors and particularly with new developements (e.g. within the framework of the above-mentioned second series of Pinch concepts) although on the basis of this discovery it was already established that these means could not bring us any nearer to achieving the aim of producing energy by nuclear fusion, an aim achievable only with the precondition of continuous reactor operation and hence stable plasma containment, the only concept to guarantee stability and hence at least not to rule out from the start the possibility of achieving the aim of producing energy by nuclear fusion, i.e. the picket fence concept, was after only a short time dropped on the basis of a theoretical study by a small group of scientists in Los Alamos on the grounds that this concept could in fact achieve stability but not containment of a plasma, that particularly in the mid-planes between the circulating currents generating the magnetic field for containing the plasma a high particle loss could be expected, in other words that such a system was not tight ("Project Sherwood", p. 90-91). Although another group working in New York under the direction of H. Grad was also able from theoretical studies to prove in respect of a simplified modification of the picket fence concept, known as cusped geometry and having only two circulating currents generating the magnetic field for plasma containment, that at least in the case of high $\beta$ values or relatively high plasma pressure in relation to the magnetic pressure upon the plasma such high particle losses were not to be expected, this only concept to guarantee stability was never practically realised despite completion of a series of theoretical preliminary studies for a fusion reactor suitable for energy production based on this cusped geometry concept because the programme was discontinued in the concluding phase shortly before practical realisation and those working on the programme were assigned to different tasks, in particular to theoretical investigation of a modification to the Stellarator which held out the promise of stability in continuous reactor operation ("Project Sherwood", p. 139-142).

This modification to the Stellarator consisted, according to a proposal by L. Spitzer, of superimposing upon the original confining field having magnetic flux lines extending within the discharge tube substantially parallel to the axis thereof a stabilising magnetic field with magnetic flux lines extending within the discharge tube substantially perpendicular to the axis thereof, said stabilising magnetic field being generated by six conductors extending like a sextuple thread with a very large lead helically about the discharge tube and carrying the same current ("Project Sherwood", p. 110-113). Since a twisted magnetic field of decreasing twist towards the axis is produced within the discharge tube as a cumulative field from the paraxial confining field and the stabilising magnetic field extending perpendicular to the axis ("Project Sherwood", p. 113) and the individual helical magnetic flux lines of this twisted magnetic field (unlike paraxial magnetic flux lines extending always on the same side of the axis) wind about the axis and hence successively extend now on one side of the axis then below it, now on the other side of the axis and then above it, the original configuration of the discharge tube of the Stellarator in the form of an 8 (which had been chosen so that the magnetic flux lines extending externally in one curve of the 8 extend in the other curve of the 8 internally and hence, so to speak, on the other side of the axis) was no longer necessary so that, with the introduction of the stabilising magnetic field proposed by L. Spitzer, it was simultaneously possible to go over again to toroidal discharge tubes, and this purely secondary effect of the efforts to stabilise the Stellarator in practice became a primary factor determining the whole course of further development and finally resulted in the gradual suspension of experiments with non-toroidal discharge vessels and the adoption of the toroidal discharge vessel as the basic prerequisite so to speak of new developments which, for the following reasons outlined below, must have contributed in no small way to the lack of success experienced up till now with controlled nuclear fusion.

The stabilising magnetic field was however unable to fulfil its actual main purpose, namely stable plasma containment, since in the case of a relatively high plasma pressure in relation to the magnetic pressure upon the plasma or in the case of relatively high $\beta$ values it was already theoretically unsuitable for stabilisation purposes and the possibility held out by theoretical investigations of a stabilisation at relatively low values of less than c. 20% ("Project Sherwood", p. 112, esp. footnote) was at first in any case impossible to realise in practice.

The main reason for this was that the modification of the Stellarator originally suggested by L. Spitzer with six currents of equal intensity and the same direction running helically round the discharge tube was, in view of the then standard resistive heating of the plasma by means of a direct voltage pulse induced in the discharge tube and directed in the axial direction of said tube ("Project Sherwood", p. 114, para. 2), so conceived that the stabilisation theoretically possible at $\beta$ values below 20% only intercepted or confined in the stable region axial plasma streams in the flow direction predetermined by the direct voltage pulse but excluded axial plasma streams in the reverse flow direction from the stable region.

For the six currents of equal intensity running helically round the discharge tube, given the same direction, generate within the discharge tube a "stabilising magnetic field" which has magnetic flux lines extending substantially circularly around the tube axis and which, if the intensity of the helical currents is high enough, is more powerful than the magnetic field generated by the axial plasma stream with magnetic flux lines running similarly circularly around the tube axis and so, given the same direction of the helical currents and of the plasma stream, cancels out the magnetic field generated by the plasma stream and replaces it with a magnetic field of inverse magnetic flux direction so that, upon constriction of the plasma stream at one point and the resultant increase in the field intensity of the magnetic field generated by the plasma stream at this point, the field intensity of the cumulative field made up of the stabilising magnetic field and the magnetic field generated by the plasma stream, owing to the greater intensity of the stabilising magnetic field and the opposing field strength directions of the two magnetic fields at the constriction point, does not rise but falls and the magnetic pressure upon the plasma stream consequently also falls at the constriction point and the constriction therefore disappears by itself, whereas the constriction in contrast to this in the absence of the stabilising magnetic field on account of the increasing magnetic field intensity of the plasma stream generated magnetic field at the constriction point and the consequently increasing magnetic pressure upon the plasma stream at the constriction point continues to grow until the stream at the constriction point breaks away, causing a constriction instability or a so-called bulge-type instability to occur.

Since the so-called kink instabilities, i.e. the bulging of the plasma stream towards the discharge tube wall with similarly ensuing breaking away of the stream, were practically excluded by the confining field acting as an axial guidance field for the plasma stream, it was hoped that, with the exclusion of constriction instabilities by the stabilising magnetic field, all the essential causes for the occurrence of instabilities in the axial plasma stream had been eliminated.

The fact that the constriction instabilities were however only excluded with opposing field intensity directions of the stabilising magnetic field and of the plasma stream generated magnetic field and hence only with identical direction of the helical currents generating the stabilising magnetic field and of the axial plasma stream, while with an opposing direction of the helical currents and of the axial plasma stream and hence identical field strength directions of the stabilising magnetic field and of the plasma stream generated magnetic field no stabilisation but, on the contrary, a destabilisation was anticipated, was at first not at all recognised as a possible disruptive factor because the flow direction of the axial plasma stream seemed to be fixed in advance by the direct voltage pulse driving said stream.

However, when the modification suggested by L. Spitzer was put into practice, there arose not only a series of foreseeable problems but also unexpected new problems associated with the stability of the plasma.

The foreseeable problems were basically difficulties attributable to the very low plasma pressure permissible with this modification such as, for example, technical difficulties associated with the very high vacuum, necessary on account of the very low plasma pressure, to which the discharge vessel has to be evacuated prior to introduction of the reaction gas forming the plasma, difficulties with the necessary, quite substantial reduction in the plasma contamination arising from gas pockets in the discharge vessel wall which was absolutely essential on the one hand because of the very low plasma pressure and, given a foreign gas quantity, the correspondingly high ratio of foreign gas quantity to plasma gas quantity and on the other hand because of the extended discharge times and the rising quantity, associated with the longer period of release of foreign gases from the discharge vessel wall, of released foreign gases located in the plasma, and difficulties associated with the high radiation losses caused by contamination of the plasma in particular with foreign gases of a relatively high molecular weight and with the resultant considerable cooling of the plasma and the associated further increase in gas release from the discharge vessel wall ("Project Sherwood", p. 114, para. 2).

Over and above these and various other foreseeable problems, in the experiments with the newly created modified Stellarator which was regarded as stable, a new problem which was totally unexpected in view of the hoped-for stability arose however in the form of a new, never before observed type of instability of the plasma containment during heating of the plasma with the above-mentioned direct voltage pulse ("Project Sherwood", p. 116, para. 2).

The causes of this new type of instability could not at first be explained with the result that for a long time, while an attempt was made to explain these instabilities, all that there was to go on were suppositions of varying validity. One of these suppositions was that the instabilities were attributable to the so-called runaway electrons arising with the direct voltage pulse ("Project Sherwood", p. 116, para. 3). It was thought that the electrons of the plasma, which were accelerated by the direct voltage pulse over random, relatively long, free path lengths to, in relation to the mean energy of the electrons, very high kinetic energies, were able because of their high energies to "pierce" the magnetic confining field and so reach the discharge vessel wall where they would release their energy, so that throughout the period of heating of the plasma by the direct voltage pulse energy was being conveyed from the plasma to the discharge vessel wall ("Project Sherwood", p. 188, para. 6 in conjunction with p. 114, para. 2).

Only much later was it discovered that what caused these instabilitites were axial plasma vibrations which were triggered by the sudden change in the field intensity at the beginning of the axial direct voltage pulse and led to the axial plasma stream in the discharge tube flowing during the axial plasma vibrations temporarily in the opposite direction to the direction of the direct voltage pulse and hence also in the opposite direction to that of the helical currents generating the stabilising magnetic field, causing the stabilising magnetic field during these phases of reverse flow direction to have not a stabilising but a destabilising effect.

A modification in the helical currents generating the stabilising magnetic field was then carried out to the effect that, of the original six currents running in the same direction helically around the discharge tube, three currents each offset relative to one another by 120° in a peripheral direction of the discharge tube were driven in the reverse direction so that the remaining three helical currents running in the original direction are responsible for stabilisation when the axial plasma stream is flowing in the same direction as the direct voltage pulse and the three helical currents running in the opposite direction are responsible for stabilisation when the axial plasma stream is flowing in the opposite direction to the direct voltage pulse. This change in the modification of the Stellarator originally suggested by L. Spitzer made it possible to achieve substantial improvements in stability in the form of much longer discharge times throughout which stable plasma containment could be sustained. Similar successes have been achieved with modifications of the Stellarator changed in this manner, especially at the University of Princeton, U.S.A., and the Max-Planck Institute of Plasma Physics in Garching, Germany.

These successes with the Stellarator led to the use in other concepts with toroidal discharge tubes, such as, for example, the so-called theta pinch concept (a further development of the original collapse concept described in "Project Sherwood, p. 68–71), of stabilising magnetic fields of a similar type to that used in the Stellarator which were generated by an even number of currents running helically around the discharge tube, with half flowing in one direction and half flowing in the other direction, e.g. in the said theta pinch concept by four currents running helically around the discharge tube, of which two flow in one direction and two in the other direction.

However, scant account was taken of the fact that the really effective stabilising effect of these stabilising magnetic fields (generated by two equal-sized groups of currents flowing in opposite directions helically around the discharge tube) was in no way primarily based on the considerations which had led to these stabilising magnetic fields, rather the main reason why these stabilising magnetic fields permitted stable plasma containment over extended discharge times was that they fulfilled Teller's stability criterion and were in principle magnetic fields with a magnetic field configuration similar to that of the picket fence concept (the similarity in the magnetic field configuration is evident from a cross-section through the discharge tube with the currents uniformly distributed along its periphery and flowing alternately out of the sectional plane and into said plane: for if the circular line of circumference with the currents distributed along it is imagined as a straight line, a current and magnetic field configuration is obtained similar to the upper half of the illustration of the picket fence concept in FIG. 9-2 on page 89 of "Project Sherwood").

It therefore emerges that the picket fence concept, largely ignored by specialists in the field and dropped after only a relatively short period of theoretical investigation in 1955/56 as insufficiently promising, in reality was—at any rate until the development of the so-called Tokamac—the only concept with which in practice an effective stabilising effect could actually be achieved and this concept remains to this day the only concept offering the prospect of realising an indefinite period of stable plasma containment and hence of realising a continuous operation fusion reactor suitable for energy production.

For the concept known as Tokamac, with which in practice, e.g. in the PLT (Princeton Large Torus) and the ASDEX (Axial-symmetrical Divertor Experiment), similarly effective stabilising effects (PLT: 1978 0.18 s, 60 million °C.; ASDEX: 1980 3 s) have been able to be achieved, is unsuitable for continuous reactor operation and hence also for energy production by nuclear fusion because in this concept the currents generating the stabilising magnetic field are driven by voltages induced in a metal discharge tube wall (and not as in, for example, the Stellarator by a separate direct current source) and these induced voltages must always point in the same direction owing to the unacceptability of a collapse of the stabilising magnetic field and the resultant ban on zero crossings of the currents generating the stabilising magnetic field and voltages of permanently fixed direction cannot be induced for an indefinite length of time because, with a preset voltage to be induced, the size of the magnet core required for induction increases in proportion to the square of the time during which the voltage to be induced must be sustained.

That effective stabilising effects have been able to be achieved at all with the Tokamac concept is due to the fact that this concept in principle represents the ideal implementation of the modification of the Stellarator originally proposed by L. Spitzer: for if in this modification, instead of six conductors running helically around the discharge tube and carrying the same current, so great a number of conductors running directly adjacent to one another helically around the discharge tube and carrying the same current were to be provided that the entire surface of the discharge tube was covered by such conductors running directly adjacent to one another helically around the discharge tube and carrying the same current, then this plurality of conductors may also be replaced by a metal tube if at the same time provision is made for voltages, which have the same characteristic as previously the conductors running adjacent to one another, to be induced in the metal tube.

In the Tokamac concept, such helically running voltages are induced in the toroidal metal discharge tube in that the metal torus forming the discharge tube and the annular plasma inside the metal torus each form a secondary winding of a shell-type transformer, which has a transformer core extending along the torus axis and a shell externally enclosing the torus and in whose core a constantly increasing current flowing through the primary winding generates a constantly increasing magnetic flux which in turn induces in the two secondary windings, i.e. in the metal torus and the annular plasma, rotational voltages of the same level and direction running parallel to the tube axis of the torus. The induced rotational voltage sets the plasma moving in the direction of the tube axis of the torus, thereby producing an axial plasma stream which in turn generates a magnetic field which surrounds the plasma and has circular magnetic flux lines concentric to the tube axis of the torus. Super-imposition of this magnetic field generated by the axial plasma stream by the confining field whose magnetic flux lines run parallel to the tube axis of the torus and hence perpendicular to the magnetic flux lines of the magnetic field generated by the axial plasma stream produces a cumulative field with magnetic flux lines running helically around the tube axis of the torus.

The individual charge carriers of the plasma set in motion by the induced rotational voltage then follow these helical magnetic flux lines with the result that the axial plasma stream contains, besides its axial component pointing in the direction of the tube axis of the torus, an additional azimuthal component pointing in the direction of rotation about the tube axis of the torus, and the magnetic field generated by this azimuthal component of the axial plasma stream finally induces in the metal torus an annular voltage which runs around the tube axis of the torus and whose superimposition by the rotational voltage induced by the shell-type transformer and running parallel to the tube axis of the torus produces a helical characteristic in the voltages in the metal torus forming the discharge tube. The voltages running helically about the tube axis of the torus in the metal torus in turn drive helical currents in the metal torus which, if the system and its operating parameters are suitably dimensioned, may together be of the same magnitude as the sum of the six individual currents running helically around the discharge tube in the Stellarator and may also have the same characteristic as these.

Thus, the Tokamac concept allows the same current and magnetic field configurations as the modification to the Stellarator originally proposed by L. Spitzer and hence also the stability, which according to the theoretical studies of L. Spitzer was to be achievable with such current and magnetic field configurations, but it excludes the possibility, which still exists in practice in this modification of the Stellarator for the reasons mentioned above, of the occurrence of axial plasma vibrations and plasma instabilities caused thereby because in this concept, in contrast to the electrically non-conductive discharge tube of the Stellarator, an electrically conductive metal torus is provided as a discharge tube which, because of the permanent coupling effected by said shell-type transformer between the annular plasma forming the one secondary winding of this transformer and the metal torus forming the other secondary winding of the transformer, acts as a strong damper which is connected in parallel to the annular plasma and does not allow the axial plasma vibrations to occur in the first place.

With the Tokamac concept, it is therefore possible to realise in practice the stability which in theory should have already been a feature of the modification to the Stellarator proposed by L. Spitzer and for this reason an effective stabilising effect has in practice also been achievable with the Tokamac concept (and not only with the above-described changed modification of the Stellarator with two equal-sized groups of currents flowing in opposite directions around the discharge tube or the picket fence concept realised therein).

The drawback of the Tokamac concept is however that this stabilising effect is in practice limited in time because the currents generating the stabilising magnetic field in the Tokamac concept are driven by the voltages induced in the metal discharge tube wall and the size of the magnet core required to induce these voltages and hence of course also the size and cost of the entire fusion system as already mentioned increase in proportion to the square of the sustenance time of the induced voltages. For since, according to the Lawson criterion, ignition of the plasma can only occur when the product of the sustenance time and the particle density lies above $3 \times 10^{14}$ s/cm$^3$ and the particle density has a ceiling imposed by the maximum achievable magnetic pressure upon the plasma and the maximum permissible $\beta$ values, ignition of the plasma can in practice only be achieved by increasing the sustenance time, and since the size and cost of the fusion system increase in proportion to the square of the sustenance time, the limit of what is technically and financially feasible here is very quickly reached. This is clearly evident from the size and cost development of experimental reactors for controlled nuclear fusion for, whereas initially the experimental plants still operating according to the Stellarator concept, such as, for example, the Stellarator C developed in Princeton with a size of around 20 m³ and an outlay of around 10 million U.S.$ or the Wendelstein in Garching with a size of around 100 m³ and an outlay of around 50 million U.S.$, were still within the budgetary scope of the relevant research institutes or the universities to which the research institutes belonged, the experimental plants operating according to the Tokamac concept, such as the ASDEX constructed in Germany with a size of around 200 m³ and an outlay in excess of 150 million U.S.$ or the JET currently under construction and jointly financed by the Western European states with a size of around 750 m³ and a projected cost in excess of 500 million U.S.$ and finally the INTOR joint venture by the U.S.A., U.S.S.R., Japan and Western Europe with a size of over 2500 m³ and estimated cost in excess of 2000 million U.S.$, can only be financed on a national or international scale.

Bearing in mind that the size of the biggest planned experimental system, i.e. the INTOR, is around 100 times the size of the Stellarator C dating from the early days of research into nuclear fusion and that such a size ratio in the Tokamac concept only makes possible an increase in the sustenance time by the factor 10, then it becomes clear that the drawback of the stabilising effect in the Tokamac concept being in practice limited in time is serious enough to cast doubt on the ability of the Tokamac concept to achieve the aim of energy production by nuclear fusion. This is also already evident from the results of the planning stage of the INTOR which reveal that with the INTOR nuclear fusion itself and ignition of the plasma should be achievable but that the power gain through nuclear fusion at 5 to 10 MW is only 2.5 to 5% of the power consumption of around 200 MW required to operate the INTOR.

And since this fairly negative power balance could only be improved to the extent where an acceptable positive power balance of less than 50% own consumption by the fusion reactor of the power generated by nuclear fusion could be anticipated by increasing the planned containment time for the INTOR of 6 to 12 seconds to a period of several minutes and such an increase in the containment time would make the costs for the fusion reactor soar immeasurably, then even if energy production through nuclear fusion were theoretically attainable with the Tokamac concept, such a solution would be impracticable on the grounds of cost.

In practical terms, this means that the Tokamac concept is also ruled out for energy production by nuclear fusion and is ruled out in the end for the same reason that made all the other concepts tried out in the course of nuclear fusion development unsuitable for energy production by nuclear fusion, namely that none of these concepts guarantees the stability of the plasma over periods of indefinite length which is required to sustain the plasma containment for an unlimited time, in other words none of these concepts is inherently stable.

The question then arises of the correctness of the decision taken mid-1956 during the initial development phase of nuclear fusion to drop the only inherently stable concept, i.e. the picket fence concept and its modification known as cusped geometry, and instead to pursue other projects which may at the time have appeared more promising but in no way fulfilled Teller's stability criterion.

For in view of the fact that in the intervening three decades, despite an enormous scientific and technical input throughout the world, it has proved impossible to find a satisfactory solution to the stability problem with the concepts practically tested in the course of nuclear fusion development, it seems fair to say that an absence of stability in a concept is a problem which cannot in practical terms—at any rate at a reasonable cost—be solved, whereas the question whether the deficiencies of the only inherently stable concept, i.e. mainly the problem of particle loss and the non-tight plasma containment in the picket fence concept and the cusped geometry based thereon, can be satisfactorily eliminated has remained largely unanswered owing to the above-mentioned decision to abandon the concept. Admittedly, during the course of the above-mentioned theoretical studies of cusped geometry, various suggestions have been made to reduce particle loss but the question, whether within the scope of this concept a plasma with a non-decreasing particle number can be achieved for an indefinite length of time and whether the particle loss problem can be completely eliminated, remained unanswered in these studies too.

SUMMARY OF THE INVENTION.

The aim of the invention was therefore, on the basis of the only inherently stable concept, to provide a fusion reactor of the type mentioned initially with a reaction zone which is surrounded by a magnetic field with magnetic flux lines curved in a convex manner viewed from the reaction zone, in which reactor the particle loss problem is solved and there is always in the reaction zone a sufficient number of reactant ions to sustain the fusion process with sufficient kinetic energy for fusion.

This aim is achieved according to the invention with a fusion reactor of the type mentioned initially which is characterised by a potential pot surrounding the reaction zone for the conversion of kinetic energy from ionized reactants escaping from the reaction zone into potential energy thereof and for the subsequent return of the ionized reactants into the reaction zone with reconversion of their potential energy into kinetic energy. The reaction zone expediently lies in the centre of the electric potential pot, to the upper edge of which ionized reactants are supplied and accelerated by the potential difference between edge and centre up to a kinetic energy sufficient for fusion and upon not meeting another reactant in the reaction zone pass the centre at a high speed corresponding to their kinetic energy and at the opposite side of the potential pot to their supply side again run against the potential difference at a decreasing speed towards the edge of the potential pot until their kinetic energy, shortly before reaching the potential pot edge, is again converted into potential energy, so that the process of accelerated movement towards the potential pot centre and the subsequent decelerated movement towards the potential pot edge may be repeated any number of times up to a fusion reaction in the reaction zone and consequently a large portion of the reactants supplied to the potential pot edge may be brought into fusion reaction, with the portions, which extend in the potential pot, of the magnetic flux lines of the magnetic field surrounding the reaction zone in the region between potential pot edge and reaction zone running substantially perpendicular to the equipotential lines of the electric field forming the potential pot and substantially parallel to the field lines of the electric field so that the substantially linear acceleration of the ionized reactants towards the reaction zone is not disrupted by the magnetic field surrounding the reaction zone.

The main advantage of the present fusion reactor is that it offers for the first time the possibility of indefinite continuous reactor operation and hence attainment of the goal of energy production by nuclear fusion. In principle, this possibility results from the inherent stability of the plasma containment in nuclear fusion reactors of the type mentioned initially with a reaction zone which is surrounded by a magnetic field having magnetic flux lines curved in a convex manner viewed from the reaction zone, as well as from the ability by means of the electric potential pot of the present fusion reactor to achieve complete elimination of the particle loss problem or the lack of tightness of the plasma containment which, in the known proposals for fusion reactors of the type mentioned initially (picket fence concept, cusped geometry), was regarded as an insoluble problem (Picket fence concept, "Project Sherwood", p. 91) to which partial solutions in the sense of a reduction in particle losses were conceivable only in discontinuous reactor operation (Cusped geometry, "Project Sherwood", p. 410). In the present fusion reactor, this particle loss problem is overcome with the aid of a technical trick in that removal of the particles from the direct vicinity of the reaction zone is deliberately permitted but the removing particles are returned by means of the electric potential pot with the same energy back into the reaction zone, with only one conversion of the kinetic energy of the removing particles into potential energy and one reconversion of this potential energy into kinetic energy upon the return of the particles into the reaction zone occurring in the potential pot holding the particles captive.

The electric potential pot of the present fusion reactor moreover has the critical advantage of rendering superfluous the compression of the plasma required in the known fusion reactors, because the ionized reactants supplied at the upper edge of the potential pot are compressed towards the reaction zone in the centre of the potential pot in inverse proportion to the cube of the distance from the centre so that, e.g. with a reaction zone diameter of one tenth of the potential pot diameter, "compression" to the level of $\times 1000$ occurs in the reaction zone. This advantage is of critical importance in so far as, in all known fusion reactors, compression of the plasma is effected by magnetic compression which necessitates a steep increase in the magnetic field containing the plasma or in the current generating said magnetic field and this increase inevitably leads to pulsed-mode operation of the fusion reactor if stability of the compressed plasma contained by the magnetic field as well as tight containment of said plasma are not guaranteed. However, as the stability of the plasma in the known fusion reactors with a toroidal discharge vessel decreases with increasing compression of the plasma because the originally doughnut-shaped plasma is compressed by the magnetic compression into a thin circular plasma thread and such a thin plasma thread naturally is more inclined to break, the thinner it is, magnetic compression in fusion reactors with a toroidal discharge vessel leads perforce to a restriction to pulsed-mode operation and hence to unattainability of the goal of energy production by nuclear fusion.

The electric potential pot of the present fusion reactor therefore not only ensures the above-mentioned complete elimination of the particle loss problem as yet unsolved in the proposed fusion reactors of the type mentioned initially (picket fence concept, cusped geometry) but also, owing to the fact that its compression of the reactants in the reaction zone is effected without magnetic compression, fulfils all the other preconditions for continuous reactor operation, i.e. overcomes the pulsed-mode operation previously unavoidable in all the known fusion reactors, including the proposed fusion reactors of the type mentioned initially, on account of magnetic compression of the plasma and eliminates the stability problems occurring in fusion reactors with a toroidal discharge vessel on account of magnetic compression of the plasma, so that only by equipping fusion reactors of the type mentioned initially with such a potential pot will the transition from discontinuous to continuous reactor operation and hence to energy production by nuclear fusion be possible.

The non-magnetic compression of the reactants in the reaction zone by the electric potential pot plays a positive role in that the magnetic field containing the plasma in the reaction zone may, because there is no longer any need for magnetic compression, be held constant or left at a constant magnetic field intensity during operation of the reactor, which in conjunction with generation of the magnetic field by means of superconducting coils opens up the possibility of reducing the energy required to sustain the magnetic field containing the plasma during operation of the reactor virtually to zero and so improving the energy balance of the present fusion reactor to the extent that the aim of energy production by nuclear fusion can be achieved.

In connection with the high density of reactants in the reaction zone achievable by means of the electric potential pot, it is also an important advantage that the present fusion reactor may be operated with a much higher particle density in the reaction zone than the known fusion reactors of the Stellarator or Tokamac types because, as already mentioned, for stability reasons fusion reactors of the Stellarator or Tokamac types have to be operated with very low values of the ratio $\beta$ of plasma pressure to magnetic pressure upon the plasma and with correspondingly low particle densities in the reaction zone, whereas fusion reactors of the type mentioned initially, as demonstrated above by the example of cusped geometry, are preferably operated with high $\beta$ values and correspondingly large particle densities in the reaction zone. The advantage of such a high particle density in the reaction zone or a correspondingly high permissible plasma pressure is the elimination of all the aforementioned problems which arise in Stellarator or Tokamac type fusion reactors on account of the very low plasma pressure permissible in them, in particular the elimination of the cited technical problems occurring in Stellarator or Tokamac type fusion reactors with the very high vacuum required on account of the low permissible plasma pressure and with the correspondingly necessary, extremely low plasma impurities from gas pockets in the discharge vessel wall and the high radiation losses caused by such plasma impurities. In the present fusion reactor, the vacuum which is required is in contrast much lower and serious problems with plasma impurities and associated radiation losses no longer arise.

Further advantages of the present fusion reactor accrue from the basic concept of fusion reactors of the type mentioned initially realised in principle in the above-mentioned cusped geometry. In this basic concept, the reaction zone basically takes the shape of a double cone acted upon from outside by magnetic pressure and such a formation is, in a similar fashion to a hollow sphere acted upon from outside by mechanical pressure, largely insensitive to disturbances or changes suddenly occurring inside it, such as an abrupt increase in the nuclear fusion rate, because the effects of such changes suddenly occurring at any point inside it are almost immediately evenly spread over the total interior or the total reaction zone whereas, in the case where a thin circular plasma thread forms the reaction zone as in fusion reactors with a toroidal discharge vessel, the effects of such sudden changes remain localised and the plasma thread is therefore inclined to break at the point of such a sudden change. The basic concept of the present fusion reactor therefore offers not only the inherent static stability provided by the—viewed from the reaction zone—convex curvature of the magnetic flux lines of the magnetic field containing the reaction zone but also inherent dynamic stability of the plasma contained by the magnetic field in the reaction zone. One other property of said basic concept is however of critical importance for the production of nuclear fusion reactions in the reaction zone. This is that, in this basic concept, the magnetic field intensity in the centre of the reaction zone enclosed by the magnetic field is praticularly zero with the result that in the centre of the reaction zone no magnetic forces whatsoever and—since the centre of the reaction zone coincides with the centre of the electric potential pot and the electric field strength in the centre of an electric potential pot is similarly zero—no electrical forces either act upon the ionized reactants so that the reactants in the centre of the reaction zone are freely movable in all three degrees of freedom. Such free mobility of the reactants in all three degrees of freedom is however, besides the required temperature of the plasma and the required mean kinetic energy of the reactants, a basic requirement for producing nuclear fusions and this basic requirement has not up till now been fulfilled in any of the practically realised fusion reactors because the reaction zone in all these fusion reactors is permeated by a magnetic field used i.a. for stabilisation and compression of the plasma and the ionized reactants in the reaction zone are therefore freely movable only in the direction of the magnetic flux lines of this magnetic field and hence only in one and not all three degrees of freedom and this may well be one of the main reasons why, despite decades of considerable effort, nuclear fusion has up till now been unattainable with the practically realised fusion reactors.

In the present fusion reactor, means may advantageously be provided for supplying the reactor with a reaction gas preferably consisting at least partially of deuterium as well as for ionizing and supplying said gas to the upper edge of the potential pot. The advantage of such supply means is a continuous feed of new reactants which take the place of the reactants which have reacted, and such a continuous feed, while not being essential for nuclear fusion itself, may well be for continuous reactor operation. As means for ionizing and supplying the reaction gas to the reactor, there may advantageously be disposed at the upper edge of the potential pot a glow discharge chamber which is provided with means for supplying ionized reactants to the potential pot in the form of canal rays, preferably with a metal foil designed in the manner of a Lenard tube and permeable to the canal rays as a cathode. The advantage of such a glow discharge chamber as an ion source is a relatively low energy consumption for producing the ionized reactants in conjunction with the desired large-area distribution of the ion source at the upper edge of the potential pot. To achieve relatively high ion concentrations at the upper edge of the potential pot, means for producing a current-intensive glow discharge according to B. Berghaus may be provided in the glow discharge chamber.

The electric potential pot may in the present fusion reactor advantageously take the form of a rotationally symmetrical cavity having a cross-section substantially in the form of two opposing sectors of a circle, with the cusps of the two sectors which form the cross-section coinciding with the axis of symmetry of the rotationally symmetrical cavity and a median dividing said two sectors each into two identical parts standing vertically on said axis of symmetry and said upper edge of the electric potential pot lying in the region of the arc of the sectors. The apex angle of the sectors may advantageously be between 10° and 80°, preferably between 30° and 50°. The advantage of such a shape for the electric potential pot over other possible shapes, such as a circular disc-shaped cavity, is increased compression of the reactants in the reaction zone. Particularly advantageously, there may be provided, at the substantially cone-shaped side surfaces of the rotationally symmetrical cavity spatially defining the electric potential pot, means for lateral electric screening of the potential pot as well as for achieving a potential profile along the screening which is higher than or approximately the same as the potential profile along said median depending upon the distance from the potential pot centre. This has the advantage that the ionised reactants moving back and forth inside the potential pot from the region of the upper edge through the centre towards the opposite upper edge run in a kind of potential trough and so cannot reach the lateral screening of the potential pot, thereby preventing the ionised reactants from coming into contact with the material walls forming the lateral screening. The means for screening and for achieving said potential profile may advantageously comprise stacked rings made of an electrically conducting material, each of which is substantially in the shape of a short truncated cone and fits on top of the preceding ring in the stack in such a way that the ring edges of all the stacked rings together define at one side one of said substantially cone-shaped side surfaces of the rotationally symmetrical cavity. The rings may advantageously be electrically insulated from one another, preferably by means of electrically non-conducting coatings, and may be individually connected to direct voltage sources each supplying the intended potential of the ring. This has the advantage that the potential profile along the screening is independent of the movement and density of the ionised reactants moving inside the potential pot but does require a not inconsiderable technical effort on account of the individual connection of the rings to direct voltage sources each supplying the intended potential of the ring. This effort may advantageously be avoided in that the rings are electrically connected to one another by high-resistance resistors preferably formed by electrically poorly conducting coatings and means are provided for generating a current which flows through the stack and produces at the high-resistance resistors the voltage drops required to achieve said potential profile. The price which has to be paid for the advantage thereby achieved, namely removal of the technical effort associated with individual connection of the rings, is however the energy consumption of the current flowing through the stack and, provided said energy consumption is kept down by a relatively low current flowing through the stack, the dependence of the potential profile along the screening upon voltages induced in the rings as a result of the space charge of the ionised reactants moving in the potential pot.

In a preferred embodiment of the present fusion reactor, for generating the magnetic field surrounding the reaction zone, two coils with a substantially triangular winding cross-section are advantageously provided disposed coaxially to the reaction zone and the potential pot and on either side of the reaction zone and potential pot, with currents of at least approximately the same magnitude flowing in opposite directions through said coils. This embodiment has the advantage of the absolute minimum number of coils required to generate a magnetic field with magnetic flux lines curved in a convex manner viewed from the reaction zone and, because of the substantially triangular winding cross-section of the coils, the advantage of optimum adaptation of the profile of the magnetic flux lines of the magnetic field generated by the coils to the profile of the field lines of the electric field in the potential pot.

To increase the magnetic field intensity in the reaction zone and in particular between the reaction zone and the material walls surrounding it, in the present thermo-nuclear reactor and in particular in said preferred embodiment thereof, a substantially hollow sphere-shaped reactor shell which encloses the coils and the potential pot and is made of a ferromagnetic material, preferably soft iron, may advantageously be provided, with one side of the substantially triangular winding cross-section of the coils advantageously being adjacent to the reactor shell inner wall and extending approximately parallel thereto and a linear extension of the median between the other two sides of the triangular winding cross-section extending through the centre of the reaction zone. The advantage of such a reactor shell made of ferromagnetic material is, with a predetermined coil current, an increase in the magnetic field intensity in the reaction zone and, with a predetermined magnetic field intensity in the reaction zone, a reduction in the coil current for generating the magnetic field surrounding the reaction zone.

In the present fusion reactor and in particular in said preferred embodiment thereof, the coils may particularly advantageously be superconducting coils comprising tubular windings through which a cooling medium preferably formed by a liquefied gas flows and keeps the current-conducting walls of said windings at a temperature within the superconductivity range of the material of said walls, with means for supplying the cooling medium to the coils being provided and each of the two coils being surrounded by a heat-insulating shell preferably constructed in the manner of a Dewar flask. The advantage of such superconducting coils is that the energy consumption for generating the magnetic field surrounding the reaction zone may be kept so low that it no longer has any significant influence upon the energy balance of the fusion reactor.

The substantially triangular winding cross-section of the coils in said preferred embodiment of the present thermo-nuclear reactor may advantageously basically take the form of an equilateral triangle, with the windings of the coils being formed by preferably tubular conductors, the cross-section of which conductors preferably likewise has the external shape of an equilateral triangle, and with the median between the two triangle sides, pointing approximately towards the reaction zone, of the substantially triangular winding cross-section of the coils making an angle in the region of 30° to 50°, preferably between 37° and 43°, with the axis of the coaxially disposed coils. The advantage of such a winding cross-section section in the form of an equilateral triangle is that the conductor cross-section of the coil windings may also take the form of an equilateral triangle so that almost complete utilisation of the winding space of the coils and consequently a maximum magnetic field intensity in the vicinity of the coils and hence also in the outer regions of the reaction zone may be achieved.

For the capture and chemonuclear conversion of neutrons released in nuclear fusion reactions, there may advantageously be provided in the present fusion reactor a blanket which surrounds the reaction zone and the potential pot and in which in liquid lithium flows from a storage tank, disposed in the region of the upper edge of the pot and covering the potential pot in this region, along the side surfaces of the potential pot into the region surrounding the reaction zone and from there approximately in the direction of the axis of the reaction zone and potential pot into a collecting tank, the collecting tank being connected to the storage tank by a separating device, preferably a tritium stripper, and a first heat exchanger as well as by a lithium pump for circulating the liquid lithium through the blanket. Advantageously, the flow cross-section for the liquid lithium may be at least approximately constant in the portions of the blanket extending along the side surfaces of the potential pot and approximately in the direction of the axis of reaction zone and potential pot in order to achieve a substantially constant flow rate of the lithium in said portions of the blanket and the width of the, in said portions of the blanket, annular flow cross-section may for this purpose be at least approximately inversely proportional to the mean diameter of the annular flow cross-section or to the mean distance of the flow cross-section from the axis of reaction zone and potential pot. The blanket surrounding both the reaction zone and the potential pot has the advantage that almost no neutrons can escape from the fusion reactor, and the advantage of a constant flow cross-section for the lithium in the blanket lies in the fact that it allows a combination of a high flow rate with laminar, non-turbulent flow of the lithium and that as a result the width of the annular flow cross-section and consequently the capture effect of the lithium is greatest at the point where the most neutrons are to be captured, i.e. in the vicinity of the reaction zone. Said first heat exchanger in the lithium circuit may give up its heat advantageously to a potassium circuit passing through a second heat exchanger and a potassium turbine, the potassium turbine driving a first generator for generating electric energy, and the second heat exchanger advantageously gives up its heat to a water/steam circuit leading through a steam turbine as well as a condenser and a pump, the steam turbine driving a second generator for generating electric energy. The advantage of such a two-stage heat exchange with a potassium circuit in the first stage is the adaptability of the potassium circuit to the temperature in the lithium circuit.

In the present fusion reactor, means may also advantageously be provided for supplying reactants to the reaction zone and for discharging reaction products and excess reaction gas from the reaction zone, said means comprising at least one gas reservoir for gas to be supplied to the reaction zone, supply means, preferably with a supply channel coaxial to the axis of the reactor, for supplying reaction gas from at least one gas reservoir to the reaction zone, discharge means, preferably with a discharge channel coaxial to the axis of the reactor, for carrying reaction products and excess reaction gas away from the reaction zone, a gas separating system, preferably in the form of a gas fractionator, for the gas coming from the reaction zone and a gas pump, preferably a vacuum pump, for conveying gas out of the reaction zone as well as preferably in the circuit through the gas separating system, gas reservoir, supply means, reaction zone and discharge means. Besides carrying reaction products away from the reaction zone, such gas supply and discharge means have the advantage of opening up the possibility of supplying to the reaction zone un-ionised reactants which are ionized in the reaction zone and whose electrons released during said ionization, together with the ions thereby produced and the ionized reactants from the potential pot, form a true plasma of ions and electrons in the reaction zone. A further advantage of such means is the movement of the supplied atoms in the axial direction of the reactor for, since this direction of movement is substantially perpendicular to the direction of movement of the ionized reactants passing from the potential pot into the reaction zone, there is a much greater chance of collisions between ionized reactants from the potential pot and ionized reactants from the supply channel with subsequent fusion reaction than there is of collisions of the ionized reactants from the potential pot with one another because, just as with sustaining an unstable equilibrium, there is virtually no chance of a frontal collision between atomic nuclei moving towards one another in a straight line because atomic nuclei of like electrical charge avoid one another while a similar avoiding process with atomic nuclei moving at right angles to one another quite often does not rule out a collision of the atomic nuclei.

BRIEF DESCRIPTION OF THE DRAWINGS

The invention is described in detail hereinafter with reference to the fundamental physical principles, an embodiment and the following drawings. The drawings show FIGS. 1a–1e the picket fence concept and its translation into the stabilising concept for the Stellarator FIG. 1a the picket fence concept (cf. also "Project Sherwood", p. 89, Fig. 9-2)

FIG. 1b the upper half of FIG. 1a with currents flowing alternately out of and into the drawing plane and with the magnetic field generated by said currents FIG. 1c a slightly curved form of the current and magnetic field configuration shown in FIG. 1b FIG. 1d a highly curved form of the current and magnetic field configuration shown in FIG. 1b FIG. 1e a cross-section through the toroidal discharge tube of a Stellarator with stabilising currents and a stabilising magnetic field generated by said currents in accordance with the form of the current and magnetic field configuration of the picket fence concept shown in FIG. 1b which is bent round into a circle.

FIGS. 2a–2c the cusped geometry concept and its translation into the concept according to the invention FIG. 2a the cusped geometry concept (cf. also "Project Sherwood", p. 141, Fig. 14-1c)

FIG. 2b a modification of the concept shown in FIG. 2a for translation into the concept according to the invention having a large-area triangular winding cross-section of the coils carrying the current for generating the magnetic field instead of the small circular wire cross-section of the "coils" having one winding each and carrying the current for generating the magnetic field in the cusped geometry concept FIG. 2c the concept according to the invention having a current and magnetic field configuration as in the modified cusped geometry concept of FIG. 2b and a potential pot with a large-area annular ion source at the potential pot edge (thin continuous lines=magnetic flux lines of the magnetic field generated by the coils, thin dashed lines=electric field lines leading from the potential pot edge to the centre)

FIG. 3 the potential profile in section through the potential pot and the speed or the energy of the ionized reactants in the region of the potential pot edge and in the centre of the potential pot FIG. 4 the potential pot in plan view and the high compression of the ionized reactants supplied at the potential pot edge in the centre of the potential pot FIG. 5 the trough-like potential profile inside the potential pot between the two cone-shaped side surfaces of the potential pot, and the prevention effected by said trough-like potential profile of contacts of the ionized reactants in the potential pot with the cone-shaped side surfaces of the potential pot FIG. 6 a diagrammatic view of an embodiment of a fusion reactor according to the invention with the associated supply equipment and devices for converting the fusion energy into electric energy.

DETAILED DESCRIPTION

Figure 6:
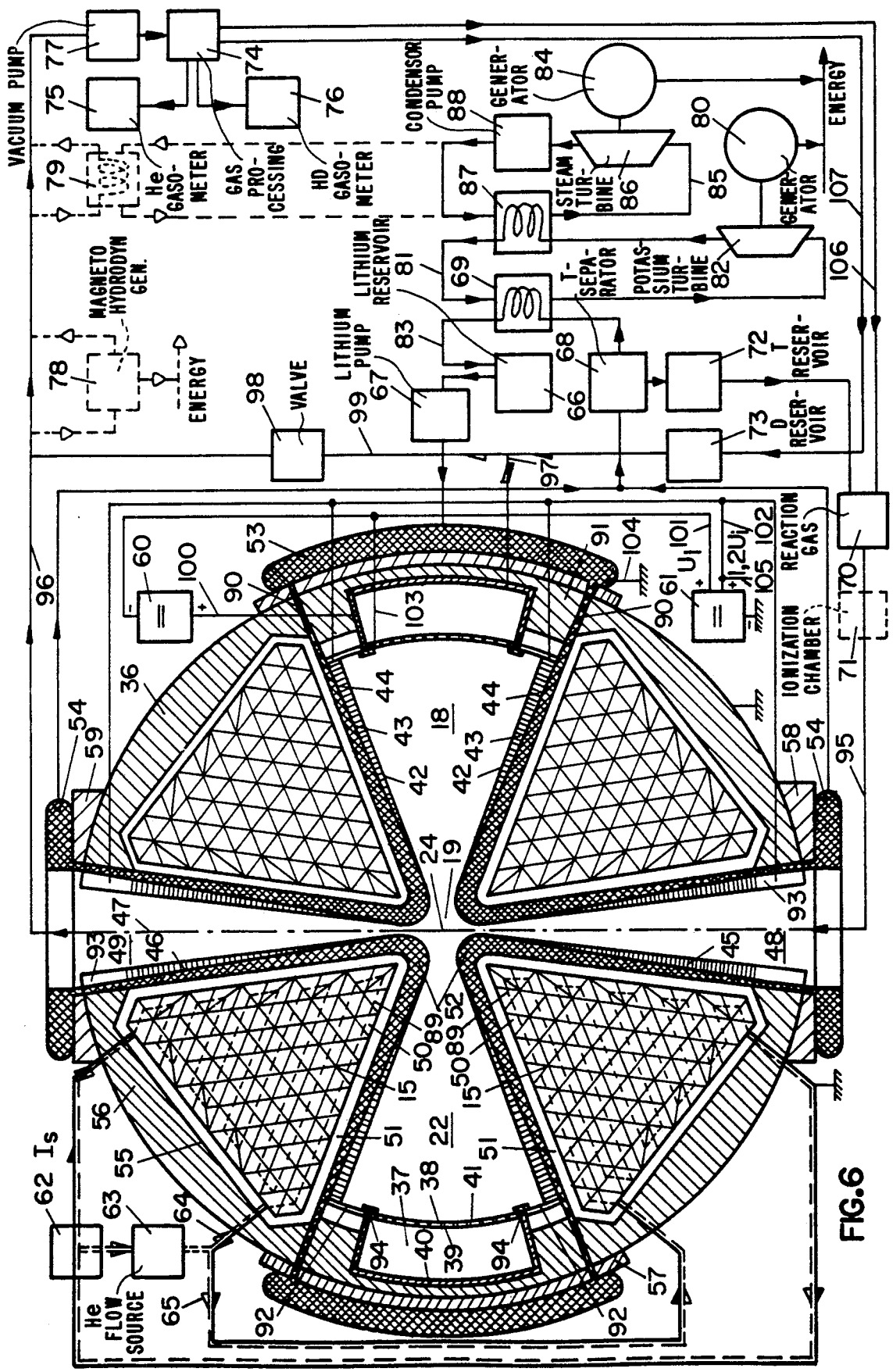

In order to elucidate the fundamental physical principles of the present invention, it is at this stage first to be demonstrated clearly once more with reference to FIGS. 1a–1e that it has been proven not only in theory but also in practice that stable plasma containment is possible only on the basis of the picket fence concept, i.e. with the aid of a stabilising magnetic field which fulfils Teller's stability criterion. This is to be demonstrated here by the translation of the current and magnetic field configuration of the picket fence concept into the current and magnetic field configuration of the stabilising magnetic field which is used in the Stellarator, e.g. in the Wendelstein—but also in Tokamac type fusion reactors such as the JET—and by means of which substantial prolongations of the plasma containment times have been made possible and containment times in the order of magnitude of seconds have been attainable in practice for the first time.

In the picket fence concept (FIG. 1a), as already mentioned, a magnetic field with magnetic flux lines 3 curved in a convex manner when viewed from the reaction zone 2 is generated by a large number of equally strong circulating currents which flow in wire loops 4, disposed parallel to and at the same axial distance apart from one another, each in the opposite current direction to the adjacent circulating current about the same axis 5 and surround the reaction zone 2 and the plasma 6 of reactants located in the reaction zone (shown here in the form of evenly distributed dots) with the magnetic field 1 which they generate. The current directions are each identified in FIG. 1a and in FIGS. 1b–1e and 2a–2c by an "x" for a current flowing into the drawing plane and a point for a current flowing out of the drawing plane.

Since the current and magnetic field configuration of the picket fence concept shown in FIG. 1a is rotationally symmetrical to the axis 5, the upper half of FIG. 1a shown in FIG. 1b is sufficient to illustrate said current and magnetic field configuration. If the current and magnetic field configuration shown in FIG. 1b is then bent round, as is shown step by step in FIGS. 1b-1e, into the circular current and magnetic field configuration shown in FIG. 1e, the same current and magnetic field configuration is obtained as in a cross-section through the discharge tube 7 of a toroidal discharge vessel on the periphery of which equally strong stabilising currents of alternately opposite current direction are distributed at the same angular distance apart and generate the stabilising magnetic field 8 shown in FIG. 1e with magnetic flux lines 10 curved in a convex manner relative to the reaction zone 9.

The known experimental fusion reactors with which relatively long plasma containment times in the order of magnitude of seconds have been achievable are without exception reactors with a toroidal discharge vessel in which equally strong stabilising currents of alternately opposite current direction are distributed at the same angular distance apart on the periphery of the discharge tube and generate a stabilising magnetic field as in FIG. 1e with magnetic flux lines curved in a convex manner relative to the reaction zone, with the stabilising currents in Stellarator type reactors such as the Wendelstein running helically around the discharge tube and in Tokamac type reactors such as the JET running parallel to the tube axis of the discharge tube. With experimental fusion reactors without a stabilising magnetic field as in FIG. 1e with magnetic flux lines curved in a convex manner relative to the reaction zone, on the other hand, in any case with hot plasmas no such plasma containment times in the order of magnitude of seconds but only containment times below 0.1 seconds, in the order of magnitude of milliseconds, could be achieved. This shows that it must be regarded as proven, not only in theory but also in practice, that a current and magnetic field configuration which fulfils Teller's stability criterion as in FIG. 1e or in the picket fence concept is one of the essential conditions for stable plasma containment and hence for continuous reactor operation. Naturally, besides said condition regarding fulfilment of Teller's stability criterion, a whole range of other conditions has to be fulfilled, such as a tight plasma containment or the avoidance of leakage points in the magnetic field containing the plasma or of plasma losses at such points as well as extensive avoidance of contamination of the plasma by foreign gases and the radiation losses caused thereby and in particular avoidance of a shape, predestined to cause instabilities from the start, for the reaction zone and the plasma contained therein (such as the inherent instability of a thin circular plasma thread in a toroidal discharge vessel), before indefinite stable plasma containment can be achieved, i.e. the fulfilment of Teller's criterion is a necessary but not all-encompassing condition for indefinite stable plasma containment, but a current and magnetic field configuration as in the picket fence concept which fulfils Teller's stability criterion is, as has empirically been proven, certainly a basic requirement for stability of the plasma contained in the reaction zone and for a continuous operation fusion reactor.

A concept for a continuous operation fusion reactor must therefore be based in principle upon the picket fence concept and moreover exclude the hitherto standard torus shape of the discharge vessel in order to avoid a shape of the reaction zone which is predestined to cause instabilities from the start. Since the simplest variation of the picket fence concept is the above-mentioned cusped geometry (FIG. 2a) with only two parallel wire loops 11 and accordingly only two circulating currents of equal strength flowing in opposite directions to generate the magnetic field 13 containing the reaction zone 12 and having magnetic flux lines 14 curved in a convex manner relative to the reaction zone, and the reaction zone 12 in cusped geometry, as FIG. 2a shows, has basically the shape of a double cone and hence has a shape of inherent static and dynamic stability which, unlike the thread shape of a reaction zone formed by a circular plasma thread in toroidal discharge vessels, is not predestined to cause instabilities from the start, and since in addition contamination of the plasma 14 by foreign gases is, because of the high particle density in the reaction zone 12 (see "Project Sherwood", p. 139/140) in cusped geometry, percentally much lower than with the very low particle densities in the reaction zone of reactors with toroidal discharge vessels and so, with cusped geometry, there are also no longer any serious problems with plasma contamination and its associated radiation losses, the right starting point for a concept of a continuous operation fusion reactor is the cusped geometry shown in FIG. 2a (cf. "Project Sherwood", p. 141, Fig. 14-1c).

The shortcomings of cusped geometry which existed in its time, i.e. the as yet incomplete tightness of the plasma containment with high particle densities in the reaction zone and the problems to be anticipated owing to lack of tightness of the plasma containment with low particle densities in the reaction zone during compression of the plasma in the transition phase from low to high particle densities in the reaction zone (see "Project Sherwood", p. 139/140), were surmountable with the concept according to the invention primarily by means of said potential pot and, in conjunction with this, by transforming the wire loops carrying the two circula circulating currents into coils with a large triangular winding cross-section.

The transformation of the two wire loops 1 of FIG. 2a into coils 15 with a large triangular winding cross-section is shown diagrammatically in FIG. 2b. The main purpose of this transformation is the creation of a magnetic field 16 in which the magnetic flux lines 17 in the region 18 provided for the potential pot run, in a similar fashion to the electric field lines in the potential pot, substantially radially towards the centre 24 of the reaction zone 19 and hence substantially parallel to the electric field lines in the potential pot, so that the acceleration of the ionized reactants in the electric field of the potential pot towards the reaction zone 19 is not disrupted by the magnetic field 16 or the magnetic flux lines 17 running substantially in the same direction as the electric field lines because no forces are exerted by the magnetic field upon ions moving in a magnetic field along the magnetic flux lines.

Since the magnetic field 16 is then generated to a large extent by the directly adjacent currents, i.e. by the currents which flow out of and into the drawing plane at the side 20 of the triangular winding cross-section of the coils 15, the winding cross-section of the coils 15 could in principle, instead of being triangular, take the shape of a long narrow rectangle coincident with the triangle side 20 but in this case the magnetic field strengths of the magnetic field 16 and hence of course also the magnetic field strengths in the vicinity of the reaction zone 19 would, given the same current density in the rectangular area as in the illustrated triangular winding cross-section, certainly be to some extent lower than in the case of the triangular winding cross-section of the coils 15. The advantage of such a winding cross-section in the form of a long narrow rectangle would be, however, a lower energy consumption for generating the magnetic field, both in the case of the same current density in the rectangular area as in the triangular winding cross-section and in the case of a current density in the rectangular area so much greater than in the triangular winding cross-section that, with the greater current density in the rectangular area, magnetic field intensities of the magnetic field 16 are produced which are as great as with the lower current density in the triangular winding cross-section. However, since the magnetic field strengths of the magnetic field 16 should as a rule be as great as possible in order to achieve the maximum possible magnetic pressure upon the plasma in the reaction zone 19 or to enable the greatest possible plasma pressure in the reaction zone 19 and the current density in the winding cross-section of the coils 15 is, at any rate in the case of superconducting coils, subject to an upper limit, the triangular winding cross-section of the coils 15 is generally preferable to the winding cross-section in the form of a long narrow rectangle because, while the winding cross-section in the form of a long narrow rectangle does have the advantage of a lower energy consumption, the triangular winding cross-section offers the generally sought advantage of maximum magnetic field strengths of the magnetic field 16.

With the modification of the cusped geometry concept of FIG. 2a shown in FIG. 2b, i.e. the transformation of the two wire loops 11 into coils 15 with a large triangular winding cross-section with simultaneous formation of a region 18 intended for the potential pot in which the magnetic flux lines 17 run substantially radially towards the centre 24 of the reaction zone 19, the requirements are met for providing the cusped geometry according to the concept according to the invention with a potential pot and for thereby overcoming the afore-mentioned shortcomings of the original cusped geometry concept.

To create said potential pot, the modified cusped geometry concept of FIG. 2b is, as is shown in FIG. 2c, provided with a large-area ion source 21 forming the potential pot edge which supplies the ionised reactants to be fed to the potential pot 22 and, compared to the zero potential in the reaction zone 19, lies at a high positive potential, e.g. in the case of deuterium ions as ionized reactants to be supplied to the potential pot 22, at a positive potential between 50 kV and 250 kV. The zero potential in the reaction zone 19 is maintained by two annular electrodes (not shown in FIG. 2c) which are disposed in front of the circular edges 23 of the coils 15 facing the reaction zone 19. From the high-potential ion source 21 to the zero-potential reaction zone 19, the flux lines 25 of the electric field 26 in the potential pot 22 shown in FIG. 2c by dashed lines (to distinguish them from the continuous magnetic flux lines 17) run radially towards the centre 24 of the reaction zone 19 or of the potential pot 22 and are the lines along which the ionized reactants supplied by the ion source 21 are accelerated towards the reaction zone 19.

To prevent lateral disruptive influences upon the electric field 26 in the potential pot 22, electric screens (likewise not shown in FIG. 2c) having an electric potential dependent upon the distance from the centre 24 of the reaction zone 19 or of the potential pot 22 may advantageously be provided at the lateral boundaries of the potential pot 22 adjacent to the triangle sides 20, the potential profile of said screens preferably corresponding approximately to or advantageously being higher that the potential profile in the (in FIG. 2c, horizontal) mid-plane of the potential pot 22. Such screens are advantageous firstly because there is practically no voltage drop over the coils 15, in any case when these are superconducting coils, and so the electric potential at all points of the triangle sides 20 is approximately equal and is as a rule approximately zero potential, and secondly because the reaction zone 19 and the potential pot 22 are generally surrounded by a blanket for capturing and decelerating the fast neutrons arising during nuclear reactions with liquid lithium as a capture agent and the electric potential of the liquid lithium, because of its good electric conductivity, is likewise at all points of the blanket approximately equal and as a rule approximately zero potential, with the result that without said screens at the lateral boundaries of the potential pot 22 or behind insulating layers forming said boundaries there would be zero potential everywhere and this would naturally produce distortions in the electric field 26 in the potential pot 22 of such a kind that the eletric flux lines 25 would no longer run radially towards the reaction zone 19 in the manner required for trouble-free functioning of the potential pot.

FIGS. 3 to 5 illustrate the operating principle of the potential pot and of the concept of a fusion reactor according to the invention.

In FIG. 3, the continuous line 27 shows the potential profile in the (in FIG. 2c, horizontal) mid-plane of the potential pot 22 along a diameter of the ion source 21 with the high positive potential $U_i$ of the ion source 21 at the beginning and end of the profile and the zero potential $U_o$ in the centre 24 of reaction zone 19 and potential pot 22 in the middle of the profile, and the dashed line 28 shows the potential profile at said lateral boundaries of the potential pot 22 in dependence upon the distance from the centre 24 lying on the axis 29.

If an ionized reactant 30 is then supplied (at a negligibly low initial speed $v \approx 0$) to the potential pot 22 from the ion source 21 lying at the positive potential $U_i$, because of the positive potential difference $(U_i - U_o)$ said reactant is accelerated towards the centre 24 of the potential pot 22 (along the dotted line 31), reaches its maximum speed $v = v_{max}$ in the centre 24 and then runs (provided that it has not collided with another reactant in the reaction zone 22 or in the vicinity of the centre 24) against the negative potential difference $(U_o - U_i)$ under constant deceleration (along the dotted line 32) in the same direction on towards the point of the ion source 21 lying opposite to its supply point which it reaches under ideal circumstances, i.e. with negligibly low energy losses on its way, at the speed $v = 0$ and then reverses and runs back along the same path, just as a ball supplied to the upper edge of a dish is first accelerated towards the centre of the base of the dish, then carries on running in the same direction almost up to the upper edge of the dish on the opposite side of the dish to the supply side, then reverses and travels back along the same path.

So that the ionized reactant 30 in question, during its decelerated movement from the centre 24 (along the dotted line 32) towards the ion source 21 forming the potential pot edge, does not drift towards the aforementioned lateral boundaries of the potential pot 22 and strike the lateral boundary walls, the potential profile shown by the dashed line 28 in FIG. 3 at the lateral boundaries of the potential pot 22 is higher than the potential profile shown in FIG. 3 by the continuous line 27 in the (in FIG. 2c, horizontal) mid-plane of the potential pot 22 with the result that the ionized reactant 30 in question runs towards the ion source 21 forming the potential pot edge in a kind of potential trough in the region of the (in FIG. 2c, horizontal) mid-plane of the potential pot 22 which, given an equal distance from the centre 24, lies at a lower potential than the lateral boundaries of the potential pot 22.

The potential trough 34 resulting when the potential profiles 27 and 28 are viewed in direction 33 of FIG. 3 is shown again in perspective form in FIG. 5. In said potential trough 34, in which the curves 35 each represent lines equidistant from the centre 24 and the curves 27, 28 and 28' represent potential profiles in various radial directions out from the centre 24, the ionized reactant 30 in question moves between the two lateral boundaries of the potential pot or between the two potential profiles 28 of FIG. 5, which are higher than the potential profile 27, in the central region of the potential pot 22 or of the potential trough 34 along the lowest potential profile 27 or one of the adjacent potential profiles 28' in the same manner as a ball, in a sheet metal channel formed in the same manner as the potential trough 34, always runs in the lower-lying regions of the channel and so does not reach the upper-lying edges of the channel either when the ball is rolling with increasing deceleration up the channel or when it is rolling down under acceleration.

Collision of the ionized reactant moving in the potential pot 22 with the lateral boundary walls of the potential pot 22 is therefore excluded not only by the magnetic field 16 but also by the potential trough 34 or by the potential profile 28 at the lateral boundaries of the potential pot 22 being higher than the potential profile 27 in the central region of the potential pot 22. Similarly, a collision of the ionized reactant with the ion source 2 is normally out of the question because the ionized reactants, as already mentioned, reach the ion source 21 at a speed of, at most, $v=0$ if they have not already reversed direction before reaching the ion source 21 and such contact with the ion source at the speed of $v=0$ has no damaging effect whatsoever. It would, however, be theoretically feasible for an ionized reactant running from the ion source 21 through the potential pot 22 to obtain an added momentum in its direction of movement from another reactant colliding with it in the reaction zone 19 and consequently to reach the opposite side of the ion source 21 at a positive speed $v>0$ corresponding to this added momentum, but in practice the probability of this occurring, at any rate so far as impact speeds with potentially damaging effects are concerned, is negligibly low. And just as the ionized reactants emerging from the high positive potential $U_i$ of the ion source 21 and passing through the entire potential pot 22 can either not reach the opposite side of the ion source 21 at all or, if the worst comes to the worst, can do so only at a speed at which their collision with the ion source 21 does not cause any damage, there is of course also hardly any chance of ionized reactants, which emerge from the low potential $U_o$ of the reaction zone 19 and obtain a momentum towards the ion source 21 as a result of collision with another reactant, reaching the ion source 21 or even colliding with it at a speed resulting in damaging effects, but such ionized reactants escaping from the reaction zone 19 and moving towards the ion source 21 as a rule turn back owing to insufficient kinetic energy long before reaching the ion source 21 and fall back into the reaction zone 19.

The ionized reactants supplied by the ion source 21 to the potential pot 22 and by the latter to the reaction zone 19 can therefore neither leave the area defined by the potential pot 22 and the reaction zone 19 nor come into contact with the material walls of this area or strike against said walls with a high kinetic energy, i.e. said area, in which is no possibility of contact between the plasma contained therein and its material walls, is completely tight so that one of the major shortcomings of the original cusped geometry concept, i.e. the abovementioned still incomplete tightness of the plasma containment at high particle densities in the reaction zone, is overcome with the concept according to the invention.

The main problem of the original cusped geometry concept was, however, not primarily the afore-mentioned still incomplete tightness of the plasma containment at high particle densities in the reaction zone (according to the calculations forming the basis of cusped geometry, this would not be as good as desired but would still be good enough for the cusped geometry concept to be of practical interest; see "Project Sherwood", p. 140, lines 1–6) but the above-mentioned difficulties which were to be expected because of the incomplete tightness of the plasma containment at low particle densities in the reaction zone during the compression of the plasma in the transition phase from low to high particle densities (see "Project Sherwood", p. 140, lines 30–35), and this problem does not arise at all in the concept according to the invention on account of the potential pot provided there, because the potential pot guarantees complete tightness of the plasma containment at any particle density in the reaction zone (the ionized reactants moving out of the reaction zone are returned by the potential pot with the same energy back into the reaction zone, with only a conversion of the kinetic energy of the departing ionized reactants into potential energy within the potential pot and a reconversion of said potential energy into kinetic energy upon return of said reactants into the reaction zone) and because the potential pot renders compression of the plasma, at any rate in the form of magnetic compression provided for cusped geometry (see "Project Sherwood", p. 140, lines 30–32, in conjunction with p. 143–147), superfluous since the ionized reactants 30 supplied by the ion source 21 to the potential pot 22 are automatically compressed, as is explained in principle by the view of the (in FIG. 2c horizontal) mid-plane of the potential pot 22 of FIG. 4, in the region of the centre of the potential pot 22 or of the reaction zone 19 and are compressed in proportion to the cube of the ratio of the diameter of the ion source 21 to the diameter of the reaction zone 19, i.e. in the case of a diameter ratio of 10:1, by $\times 1000$, so that compression of the plasma in the conventional sense is superfluous.

Besides the "compression" of the ionized reactants 30 in the region of the centre 24 of the potential pot 22 or the reaction zone 19, FIG. 4 also shows that the ionized reactants arrive from all direction in the region of the centre of the potential pot 22 in the reaction zone 19 and therefore also move in all directions in the reaction zone 19, with this freedom of movement in all directions, owing to the nearly constant electric potential resulting from FIG. 3 in the region of the centre 24 of the potential pot 22 and the resultant zero electric field strength in the reaction zone 19 as well as the zero magnetic field strength resulting from FIGS. 2a and 2b in the region of the centre 24 of potential pot 22 and reaction zone 19, also not being restricted by electric or magnetic forces acting upon the ionized reactants with the result that, at least in the central region of the reaction zone 19, there is freedom of movement of the ionized reactants in all three degrees of freedom so that, with the concept according to the invention, for the first time one of the major basic conditions for producing nuclear fusions has been able to be fulfilled.

With the indefinite stable containment of ionized reactants 30 in the potential pot 22 shown in FIG. 3, the high kinetic energy also evident from FIG. 3 of the ionized reactants 30 in the centre 24 of the potential pot 22 or the resultant high temperature of the plasma in the reaction zone 19, the high compression shown in FIG. 4 of the plasma in the centre of the potential pot 22 or reaction zone 19 as well as the movement evident also from FIG. 4 of the reactants in the reaction zone in all possible directions and the resultant free mobility of the reactants in the reaction zone and finally the electrostatic and electromagnetic exclusion shown in FIGS. 5 and 3 as well as 2c and 2b of contact between the plasma and material walls, all the required conditions for producing nuclear fusions in the reaction zone and for stable operation of the fusion reactor according to the invention over an indefinite period of time are met.

An embodiment of a fusion reactor according to the invention with the appertaining supply equipment and devices for converting the fusion energy into electric energy is diagrammatically illustrated in FIG. 6.

The fusion reactor 36 of FIG. 6 comprises the annular glow discharge chamber 37 serving as ion source 21, in which a glow discharge, preferably in the form of a current-intensive glow discharge according to B. Berghaus, is generated between the cathode 39 forming the upper edge 38 of the potential pot 22 and the anode 40 and a portion of the ions arising in the glow discharge is supplied to the potential pot 22 as canal rays through a thin metal foil, supported by a metal perforated plate 41 and constructed in the manner of a Lenard window as cathode, further comprises at the cone-shaped side surfaces 42, spatially delinining the potential pot 22, of the rotationally symmetrical cavity 18 forming the potential pot 22 the above-mentioned screening means 43 for lateral electric screening of the potential pot 22 and for achieving a potential profile 28 along the screening means 43 which is higher than the potential profile 27 in the (in FIG. 6, horizontal) mid-plane of the potential pot 22 in dependence upon the distance from the potential pot centre 24, said means being formed by stacked truncated cone-shaped metal rings 44 electrically connected to one another by ring coatings forming high-resistance resistors and forming with their ring edges said side surfaces 42, further comprises the screening means 45 and 46 constructed in the same manner as the screening means 43 for electric screening of the channels 48 and 49 coaxial to the reactor axis 47 for supplying and discharging reactants and reaction products to and from the reaction zone 19, further the two electrically series-connected superconducting coils 15, through which the coil current $I_s$ flows in opposite direction, having tubular windings 50 of triangular line cross-section for generating the magnetic field 16 surrounding the reaction zone 19 and having magnetic flux lines 17 curved in a convex manner relative to the reaction zone, as well as for thermal insulation of the superconducting coils 15 the thermally insulating shells 51 surrounding the coils and constructed in the manner of Dewar flasks, further for the capture and chemonuclear conversion of neutrons liberated during nuclear fusion reactions and for heat dissipation from the reaction zone 19 the blanket 52 through which liquid lithium flows and which has the annular storage tank 53 on the input side and the collecting tanks 54 on the output side, and finally for increasing the magnetic field strength of the magnetic field 16 generated by the coils 15 between reaction zone 19 and the material walls surrounding said zone the substantially hollow sphere-shaped reactor shell 56 made of a ferromagnetic material, preferably soft iron, which surrounds the coils 15 and the potential pot 22 and whose inner wall 55 is adjacent to a respective triangle side of the substantially triangular winding cross-section of the coils 15, as well as the heat protection plates 57, 58 and 59 for thermal insulation between the reactor shell 56 and the storage tank 53 and the collecting tanks 54.

The supply equipment for the fusion reactor of FIG. 6 comprises the voltage source 60 for producing and maintaining the glow discharge in the glow discharge chamber 37, the high-voltage source 61 for producing the potential gradient in the potential pot 22 and for supplying power to the screening means 43, 45 and 46 for electric screening of the potential pot 22 and the channels 48 and 49, the high-current source 62 for driving the coil current $I_s$ through the superconducting coils 15 during the build-up of the magnetic field 16 surrounding the coils 15, the coolant flow source 63 for producing coolant flows 64 and 64 of a liquefied gas, consisting preferably of liquid helium, through the tubular windings 50 of the two super-conducting coils 15 to maintain a temperature of the current-conducting walls of the tubular windings 50 within the superconductivity range of the material of said walls, the lithium pump 67 connected on the input side to the lithium reservoir 66 for delivering the liquid lithium circulating through the blanket 52 over the storage tank 53, the collecting tanks 54, the separating device 68, preferably comprising a tritium stripper for the lithium leaving the fusion reactor 36, and the heat exchanger 69, the reaction gas reservoir 70 provided for supplying reaction gas to the reaction zone 19 over the channel 48 as well as, optionally, the ionization chamber 71 for at least partial ionisation of the reaction gas to be supplied through channel 48 to the reaction zone 19, the tritium reservoir 72 connected on its input side to the output of the tritium stripper or the separating device 68 and on its output side to the reaction gas reservoir 70, the deuterium reservoir 73 provided for supplying deuterium to the glow discharge chamber 37, the gas processing system 74 which preferably comprises a gas fractionator for separating helium and hydrogen from the gas coming from the reaction zone 19 and for dividing the residual gas into deuterium and tritium-containing gas and has a helium gasometer 75 and a hydrogen gasometer 76 connected thereto, and a gas pump 77 preferably in the form of a vacuum pump for supplying reaction products and excess reaction gas from the reaction zone through the channel 49 and for delivering gas circulating through the gas processing system 74, the reaction gas reservoir 70 and the channel 48 and/or the deuterium reservoir 73 and the glow discharge chamber 37, the reaction zone 19 and the channel 49 as well as, optionally, through the magnetohydrodynamic generator 78 and/or the heat exchanger 79.

The devices for converting the fusion energy generated by the fusion reactor 36 of FIG. 6 into electric energy finally comprise a first generator 80 for generating electric energy, a potassium turbine 82 located in a potassium circuit 81 for driving the first generator 80, the heat exchanger 69 provided for the transfer of thermal energy from the lithium circuit 83 to the potassium circuit 81, a second generator 84 for generating electric energy, a steam turbine 86 located in a water/steam circuit 85 for driving the second generator 84, the heat exchanger 87 provided for the transfer of thermal energy from the potassium circuit 81 to the water/steam circuit 85, and the condenser 88 with an associated pump located in the water/steam circuit 85 as well as optionally, mainly for high-capacity fusion reactors, the heat exchanger 79 for the transfer of thermal energy from the gas leaving the fusion reactor 36 to the water/steam circuit 85 and, similarly optionally, the magnetohydrodynamic generator 78 for the direct conversion of kinetic energy in the gas coming from the fusion reactor 36 into electric energy.

The structure and mode of operation of said devices for converting fusion energy into electric energy and said supply equipment for the fusion reactor (with the exception of the two voltage sources 60 and 61) are basically the same as for the corresponding devices and supply equipment, in the above-mentioned known fusion reactors, either planned or under construction, having a toroidal discharge vessel, by means of which ignition of the plasma and hence generation of fusion energy are to be achieved in the reactor (such as, for example, the INTOR) so that there is no need here for a detailed explanation of said devices and equipment whose structure and mode of operation are known to men skilled in the art of fusion reactors.

The only supply equipment not occurring in said known fusion reactors are the voltage source 60 for supplying power to the glow discharge chamber 37 and the high-voltage source 61 for producing the potential gradient in the potential pot 22 and supplying power to the screening means 43, 45 and 46, these however likewise being basically appliances of a known construction whose structure and mode of operation need not be described in detail here. In the simplest instance, the voltage source 60 could be a direct voltage source such as, for example, a battery with a fixed voltage of e.g. 1000 V and a variable series resistance for adjusting the voltage applied to the glow discharge chamber 37, and the high-voltage source 61 could be a high-voltage generator with an adjustable direct voltage in the region of 50 to 250 kV similar to the high-voltage generators used in television sets to supply the cathode-ray tube, but since the energy supplied by the voltage sources 60 and 61 represents an intrinsic energy consumption of the fusion reactor 36 and so, in a fusion reactor intended for energy production, is deducted from the energy produced, it is recommended that as voltage sources 60 and 61 electronically controllable, high-efficiency voltage sources of known construction be used in which the "internal resistance" of the source is realised, not by high-resistance resistors which cause energy losses, but by a suitable electronically controlled current-voltage characteristic of the voltage sources 60 and 61.

The basic mode of operation of major components of the fusion reactor 36 itself, such as those of the superconducting coils 15, the associated heat insulation shell 51 and the blanket 52 through which liquid lithium flows, is also known from said known fusion reactors and so requires no further explanation here. However, the following should be mentioned with regard to the structure of the coils 15, the blanket 52 and the other major components of the reactor formed by the glow discharge chamber 37, the screening means 43, 45 and 46 and the ferromagnetic reactor shell 56 and their special design in the present fusion reactor 36 and the details arising from said special design regarding their mode of operation:

As FIG. 6 shows, the superconducting coils 15 have a winding cross-section basically (apart from the two outer corners) in the shape of an equilateral triangle. This opens up the possibility of also forming the liquefied-gas-carrying tubular windings 50 of the coils 15 from conductors whose line cross-section has the external shape, visible in FIG. 6, of an equilateral triangle and this has the advantage of a space factor of the winding cross-section of the coils 15 of almost 100% or, in the case of a tube aperture cross-section of the tubular windings 50 of the same size as that of the conducting line cross-section of said windings, a ratio of the line cross-section of all the coil windings 50 to the winding cross-section of the coils 15 of almost 50%. The triangular line cross-section also opens up the possibility of composing the individual coil windings 50 each from three prefabricated, truncated cone shaped rings each forming one of the three sides of the triangular line cross-section, and this is advantageous in so far as said rings and hence the coil windings may be manufactured in non-deformable materials, such as the modern superconducting ceramic materials, so that the very expensive cooling method using liquid helium as a coolant for cooling the coils 15 down to the temperature range of superconductivity may be replaced by a much less expensive cooling method using one of the other inert gases such as liquid neon, argon or krypton or using liquid hydrogen, oxygen or nitrogen or liquid air as a coolant. However, since at the present stage of development the current density of modern superconducting ceramic materials is still limited and is currently at any rate still somewhat lower than the maximum current densities of the metal materials hitherto used for superconducting coils, such as the superconducting alloys of niobium and tin, zircon or tantalum, in the present fusion reactor 36 the material which is provided for the superconducting coils 15 is a superconducting niobium-zircon alloy, also used in said known fusion reactors, and the coolant is liquid helium.

When the individual coil windings 50 are each composed of three prefabricated, truncated cone-shaped rings each forming one of the three sides of the triangular line cross-section, the rings have to be connected to one another at their joints located at the corners of the triangular line cross-section in a gas-tight manner and superconductively in the operating temperature range provided for the superconducting coils 15. The thickness of the rings may advantageous be in the range of 1/5 to 1/15 of the outer edge length of the triangular line cross-section. In the present fusion reactor 36, as the wall thickness of the tubular windings 50 are the distance between the outer and inner triangle sides of the current-conducting line cross-section, defined externally and internally by a respective equilateral triangle, of the tubular windings 50, approximately 1/10 of the outer edge length of the triangular line cross-section is provided.

When manufacturing the coil windings from non-deformable materials, such as from prefabricated truncated cone-shaped rings made of superconducting ceramic material, it is recommended to make the axes of the coil windings, not helical as in standard windings, but precisely circular and to cut open each coil winding at an interface lying obliquely relative to the axis and, by inserting a sealing and electrically insulating plate at the interface, firstly to close the tube openings at the line ends on both sides of the interface and secondly to isolate both line ends electrically from one another and to provide in the region of the two line ends laterally on each of the two side surfaces adjoining adjacent coil windings an oblong hole for supplying and discharging the coolant and a contact surface surrounding the oblong hole for supplying and discharging the electric current flowing through the coil winding so that the coolant and the electric current are supplied to the coil winding laterally of an adjacent coil winding adjoining one side surface of the coil winding by way of the oblong hole provided on said side surface at one of said two line ends for supply purposes and by way of the surrounding contact surface and, after running through the coil winding, are discharged again laterally at the other line end by way of the oblong hole provided on the other side surface of the coil winding for discharge purposes and by way of the surrounding contact surface and are supplied to the adjacent coil winding adjoining said other side surface of the coil winding.

The structure of the coils 15 comprising such cut-open annular coil windings with lateral supply and discharge of current and coolant is incidentally recommended not only when using non-deformable superconducting materials for the coil windings but also when using deformable superconducting materials such as metal superconductors if the number of turns of the coils is relatively low and consequently the gaps arising in helical coil windings at the ends of each winding lap and the resulting disruptions in the symmetry of the magnetic field generated by the coil are relatively great, whereas with a relatively large number of turns of the coils only relatively small gaps and correspondingly slight disruptions in the symmetry of the magnetic field arise, in which case helical coil windings are of course more advantageous than cut-open annular coil windings where each winding has to be separately connected to the preceding and the subsequent winding. An additional factor to be taken into account when weighing up the pros and cons of helical coil windings as opposed to cut-open annular coil windings is that with cut-open annular coil windings too, at each transfer point of the current from one coil winding to the next, because of the double change in direction of the current during the transfer disruptions arise in the magnetic field symmetry which, with a relatively small angle between the axis of the coil winding and the plate provided at the interface and a correspondingly slight change in direction of the current on transfer, are hardly outwardly apparent because the interfaces of successive coil windings are offset relative to one another approximately by the width of said contact points in an axial direction of the coil windings so that the magnetic field disruptions, if the contact point width and the angles between axis and plate at the interfaces are suitably selected, may be uniformly distributed over the periphery of the coil.

Since in the present fusion reactor the number of turns of the coils 15, at 119, is relatively low and so, with helical coil windings, relatively great disruptions in the magnetic field symmetry would have been anticipated, the coil windings 50 in the present fusion reactor 36 are, despite their deformable material of a niobium-zircon alloy, cut-open annular coil windings.

The order in which the coil current $I_s$ flows through the coil windings 50 is indicated in FIG. 6 by the dotted meander line 80. In order for this meander line to cover all the coil windings 50 and for there to be one side surface for supplying and one side surface for discharging current and coolant available for each coil winding, in the coils 15, as FIG. 6 shows, in some cases instead of two adjacent coil windings with a line cross-section in the form of an equilateral triangle, two adjacent coil windings are provided with a line cross-section in the form of an obtuse-angled isosceles triangle with a lateral side length corresponding to the side length of the equilateral triangle. Said coil windings with an obtuse-angled triangular line cross-section, although they appear as irregularities in the winding cross-section of the coils 15, do not cause any disruption in the magnetic field symmetry. If, however, irregularities in the winding cross-section of the coils 15 are to be substantially avoided, there should then be provided, instead of two adjacent coil windings with an equilateral triangular line cross-section, one coil winding of a rhombus-shaped line cross-section having a rhombus shape encompassing the two equlateral triangles, this however involving a reduction in the number of turns of the coils 15 from 119 (103 equilateral triangular and 16 obtuse-angled triangular) to 61 (55 rhombus-shaped and 6 equilateral triangular) and a corresponding increase in the coil current $I_s$.

For mutual isolation, the coil windings 50 with the exception of said contact points are coated with a thin insulating layer which, because of the extremely low (in the millivolt range) voltage difference between adjacent coil windings of superconducting coils, need not have a high dielectric strength but, because of the very high coil current (in the kA range) for superconducting coils and the resultant high pressure forces of adjacent coil windings upon one another, must have a very high compressive strength and must not be brittle at the very low temperatures required for superconductivity. The high pressure forces of adjacent coil windings upon one another moreover require the coil windings to have an extremely smooth surface, i.e. no peaks on the coil winding surface arising from surface roughness, because given the high pressure forces such peaks could puncture the insulating layer. The requirement for a thin, pressure-resistant insulating layer which does not become brittle even at very low temperatures is best met by an oxide layer on the surface of the coil windings which, in the present fusion reactor 36, is obtained by surface oxidation of the conductor material of the coil windings 50.

For thermal insulation from their environment and in particular from the blanket 52 having temperatures in the order of magnitude of 1000° C. or, more precisely, for substantially preventing heat from being supplied from the environment to the coils 15 which have to be kept at very low temperatures, the coils 15 are, as already mentioned, each surrounded by an insulating shell 51 constructed in the manner of a Dewar flask having an outwardly vapour-deposited outer wall and an inwardly vapour-deposited inner wall and a high vacuum between outer and inner wall in the order of magnitude of 10 to 0.1 μbar. By these means, the cooling capacity of the coolant flowing through the coil windings 50 is restricted to the removal of a residual low heat inflow through the thermal insulation and the, with superconductivity, negligibly low electric power consumption of the coils 15. So that this low consumption of electric power and coolant capacity for the coils 15, which is advantageous for the efficiency of the fusion reactor 36, is not increased by power loss in the supply conductors to the coils 15 to a total consumption adversely affecting the efficiency of the fusion reactor 36, the supply conductors to the coils 15 must also be kept at temperatures in the superconductivity range and, for this purpose, tubular conductors must be used as electric conductors through which the coolant streams 64 and 65 (shown by dashed lines in FIG. 6) flow and which are externally surrounded by insulating shells advantageously similarly constructed in the manner of Dewar flasks. Said superconducting supply conductors are, as is diagrammatically indicated in FIG. 6, to be run as far as the high-current source 61 and, if possible, the output circuit of the high-current source 61 itself should be kept in a superconducting state. If this is not possible, then the line cross-section should be increased quite substantially, e.g. by more than ×1000, at the transition points from superconducting electric conductors to electric conductors operating at normal temperature. Furthermore, the coolant lines leading from the coolant flow source 63 to the high-current source 62 or to the superconducting supply conductors should naturally also be surrounded by insulating shells constructed in the manner of Dewar flasks in order to avoid cooling capacity losses and to achieve a minimum temperature difference between input and output of the coolant flow source 63. Two separate coolant flow circuits 64 and 65 are moreover provided running parallel through the two coils 15 so that the temperature difference between the coolant supplied by the coolant flow source 63 and the coolant flowing back to the coolant flow source 63 after running through the coils 15 may be kept as low as possible, whereas, as FIG. 6 shows, only one coil circuit is provided leading through the two series-connected coils 15 in order to guarantee a coil current $I_s$ which is absolutely equal for both coils 15. If the above-mentioned requirements for the supply conductors to the coils 15, the high-current source 62 and the coolant flow source 63 are met, the coolant capacity to be produced by the coolant flow source is mainly determined by the heat inflow to the coils 15 through their thermal insulation, with the bulk of the inflowing heat passing by way of the supports (not shown in the diagrammatic view of FIG. 6) of the coils 15 on the reactor shell 56 to the coils 15 because said supports have to be extraordinarily stable to withstand the extreme forces exerted by the two coils 15 on one another in the sense of a mutual repulsion and the required high stability of the supports makes correspondingly large cross-sections for the support elements and hence large cross-sections for the heat inflow from the reactor shell 56 through the support elements to the coils 15 unavoidable.

As already mentioned, in the present fusion reactor 36 as in said known fusion reactors, liquid lithium flows through the blanket 52, said liquid lithium being supplied to the annular storage tank 53 at a temperature of 990° C. and during steady-state operation leaving the collecting tank 54 on the output side at a temperature of 1050° C. The reason for the, compared to the temperature difference of 576° C. between the boiling point 760° C. of potassium and the boiling point 1336° C. of lithium, slight temperature difference of 60° C. between the temperatures of the liquid lithium at the input and output of the blanket 52 is that, for the chemonuclear conversion of the neutrons liberated during nuclear fusion reactions with lithium to tritium and helium, there must always be sufficient unspent lithium available and for this reason high flow rates of the liquid lithium through the blanket 52 are desirable and the temperature increase in the lithium as it runs through the reactor or the blanket 52 is naturally less, the faster the flow rate of the lithium through the reactor. To avoid undesirable turbulence of the liquid lithium in the blanket 52, on the other hand, the flow rate of the lithium in the blanket 52 must be kept within the speed range producing a laminar flow and the blanket 52 must be structurally designed in such a way that the laminar flow is maintained throughout the flow path through the blanket 52. The structural measures required to utilise the speed range of laminar flow virtually to its upper limit are primarily a flow cross-section resulting in a constant flow rate along the flow path and remaining at least approximately constant throughout the flow path, and minimum friction against the walls laterally defining the flow path to keep down the reduction in the flow rate near the walls. The fixed flow cross-section throughout the flow path is achieved in the present fusion reactor 36 in that the width of the annular flow cross-section at all points of the flow path or of the blanket 52 is inversely proportional to the mean diameter of the annular flow cross-section or to the mean distance of the flow cross-section from the axis 47 of reaction zone 19 and potential pot 22 or, to put it briefly, the blanket 52 as shown in FIG. 6 becomes increasingly narrower, the further away the point of the blanket 52 in question is from the reactor axis 47, and to achieve low friction against the walls laterally defining the flow path, in the present fusion reactor 36 the walls of the blanket 52 are extremely smooth metal walls. The wall of the blanket 52 located at the side of the potential pot 22 is moreover provided at its side facing the potential pot 22, for insulating the blanket 52 at zero potential from the screening means 43, 45 and 46 at positive potential, with an electrically insulating coating (not shown in FIG. 6) whose thickness and hence whose dielectric strength increases the greater the distance from the potential pot centre 24 is in line with the distance-dependent rise in the potential of the screening means 43, 45 and 46 and which towards the potential pot centre 24, in the same manner as the screening means 43, 45 and 46, only extends up to the region where the reaction zone begins, i.e. approximately up to the narrowest point of the potential pot 22 or up to the narrowest point of the channels 48 and 49. The portions of the metal walls of the blanket 52 adjacent to the reaction zone 19 are on the other hand not insulated and form the electrodes which hold the potential pot centre 24 and the reaction zone 19 at zero potential and whose counter-electrode is the cathode 39, connected to a high positive potential, of the glow discharge chamber 37.

The supply lines 90 leading from the storage tank 53 to the blanket 52 are in the form of flat tubes whose inlet openings are uniformly distributed over the inner periphery of the storage tank 53 and which widen towards the blanket 52 to such an extent that their outlet openings at their narrow sides blend and the outlet openings therefore together form a common annular gap-shaped outlet opening which fits the annular gap-shaped inlet opening of the blanket 52. The flat tubes forming the supply lines 90 are so designed that the flow cross-section along each flat tube remains constant and the sum of the flow cross-sections of all the supply lines 90 is equal to the constant flow cross-section of the blanket 52, with the result that the flow rate of the liquid lithium remains constant not only in the blanket 52 but also in the supply lines 90 to the blanket 52 and so prevents any turbulence arising in the lithium flowing through the supply lines 90 and the blanket 52. Such a design for the supply lines 90 is necessary if the centre piece 91 of the reactor shell 56 is to be connected as a single piece to the other parts of the reactor shell 56. If such a single-piece connection is not required, the supply lines 90 leading from the storage tank 53 to the blanket 52 may like the inlet openings of the blanket 52 be annular gap-shaped, in other words the blanket 52 may in this case directly communicate with the storage tank 53 in the same way that the blanket 52 at its outlet openings opens out directly into the collecting tanks 54. To avoid energy losses as a result of heat transfer from the supply lines 90 or the output regions of the blanket 52 to the reactor shell 56, thermal insulation (not shown in FIG. 6) is provided between the reactor shell 56 and the supply lines 90 as well as the output regions of the blanket 52.

The screening means 43, 45 and 46 in each case, as is shown diagrammatically in FIG. 6, comprise a plurality of stacked metal rings 44, each of which is in the form of a short truncated cone and fits on top of the ring preceding it in the stack in such a way that the ring edges of all the stacked rings 44 together at one side form one of the cone-shaped side surfaces 42 of the rotationally symmetrical cavity 18 forming the potential pot 22 and at the other side rest against said electrically insulating coating with which the side of the wall of the blanket 52 facing the potential pot 22 is provided. Each of the metal rings 44 is provided at one side with an electrically poorly conducting coating forming a high-resistance resistor so that metal rings 44 belonging to the same stack are interconnected by high-resistance resistors. The first metal ring of each stack is connected to the non-insulated wall portions of the metal walls of the blanket 52 adjacent to the reaction zone 19 and the last metal ring of each stack is connected by the high-resistance resistor formed by its coating to the screening electrode 92 or 93 associated with the stack. The high-resistance resistors forming the coatings of the metal rings 44 are so dimensioned that the potential along the screening means 43 has the potential profile already described with reference to FIGS. 3 and 5 and the currents through the two stacks of metal rings 44 associated with the screening means 43 are equally great and in steady-state operation are together, given a potential of the screening electrodes 92 1.2 times the potential of the cathode 39 of the glow discharge chamber 37, lower than the electric current formed by the canal rays emerging from the upper potential pot edge 38 and that the currents through the two stacks of metal rings associated with the screening means 45 and 46 are together, given a potential of the screening electrodes 93 equal to that of the screening electrodes 92, lower than half of all the currents flowing through the screening means 43.

The reactor shall 56 is made of soft iron with a saturation induction of 2.1 tesla or 21,000 gauss. Since the magnetic field strength H of the magnetic field 16 generated by the superconducting coils 15 is however far higher than the magnetic field strength values at which saturation inductions are normally measured, the magnetic induction in the portions of the reactor shell 56 adjacent to the coils 15 or the insulating shells 51 surrounding the coils is also far higher than the saturation induction $B_s$ of soft iron and is approximately $B \approx B_s + \mu_0 H$ ($\mu_0$=absolute permeability constant). In practical terms, this means that the relative permeability of the reactor shell 56 in the vicinity of the coils 15 is only slightly greater than 1 and is approximately $\mu_{rel} \approx 1 + B_s/\mu_0 H$, i.e. for example when $\mu_0 H = 10$ tesla $= 100,000$ gauss, only approximately $\mu_{rel} \approx 1.2$, and the induction of the magnetic field 16 generated by the coils 15 within the reaction zone 19 is therefore increased by the ferromagnetic reactor shell 56 only by several percent, e.g. 5 to 10%, but even such an, albeit small, increase is naturally more advantageous than no increase at all, especially as the magnetic pressure upon the plasma in the reaction zone 19 owing to its dependence upon the square of induction increases roughly twice as much as the magnetic induction in the reaction zone. In this connection it should also be mentioned that the above-mentioned possible design of the supply lines 90 as annular gap-shaped supply lines and the resultant division of the reactor shell 56 into three portions would, owing to the previously described, actually occurring, relatively low relative permeability of the reactor shell 56, in practice have only a negligibly small influence upon the development of the magnetic field 16 generated by the coils 15 in the vicinity of the supply lines 90.

With regard to the above-mentioned optional components 71 and 78 of a fusion reactor having the structure shown in FIG. 6, it should also be mentioned regarding the arrangement of said components in practice that the ionisation chamber 71 (which could in principle be of a similar construction to the glow discharge chamber 37) would have to be disposed directly in front of the channel 48 so that the ions supplied by it and leaving at its output side can flow roughly in the direction of the axis 47 into the channel 48, and that the magnetohydrodynamic generator 78 (usually only considered for relatively high-capacity fusion reactors) would have to be disposed directly behind the channel 49 so that the ions leaving the channel 49 can flow without changing direction roughly in the direction of the axis 47 through the flow channel of the magnetohydrodynamic generator 78.

For the design of the glow discharge chamber 37 there are theoretically two possibilities: the glow discharge chamber 37 may either, like the glow discharge tubes generating canal rays and known as physical appliances (see e.g. R. W. Pohl, "Introduction to Electrical Theory", Springer-Verlag 1944, p. 165, section 101), be provided with an open electrode having sieve-like openings by means of which the glow discharge chamber 37 is in gas-permeable communication with the potential pot 22, or be provided with a cathode sealing the glow discharge chamber 37 off in a gas-tight manner from the potential pot 22 and constructed in the manner of a so-called Lenard window (see Pohl, Electrical Theory, p. 169) having a very thin metal film as an electrode and a sieve-like open metal plate as a support element for the electrode formed by the metal film.

A glow discharge chamber with a sieve-like open cathode has the advantage that a relatively large portion of the ions produced in the cathode fall of the glow discharge by collision ionization flies through the sieve-like openings of the cathode and enters the potential pot in the form of canal rays, thereby achieving a relatively high ratio of the useful current of the ion source, or the glow discharge chamber forming said ion source, formed by the canal rays to the current loss of the ion source basically formed by the ions flowing to the cathode of the glow discharge chamber, and hence a relatively high efficiency of the ion source. A relatively high efficiency of the ion source is important in so far as the power loss of the glow discharge chamber, corresponding to the product of the cathode current and the voltage between anode and cathode, is a direct deduction from the electrical power generated by the nuclear fusion system and so under unfavourable circumstances may have a distinctly adverse effect upon the efficiency of the nuclear fusion system for producing electrical power. Thus, for example, given a level of efficiency of the ion source of only 1% and a voltage between anode and cathode of the glow discharge chamber of 500 V, the power loss of the glow discharge chamber would be just as great as the power supplied to the ions in the potential pot at a potential gradient of 50 kV and would therefore have a marked influence upon the efficiency of the nuclear fusion system. Less advantageous with an open cathode of the glow discharge chamber is, however, the gas-permeable communication between glow discharge chamber and potential pot because, as a result, the gas pressure in the potential pot is no longer freely selectable but is determined by the gas pressure in the glow discharge chamber and the gas pressure in the potential pot, at any rate in larger fusion reactors, should be much lower than the gas pressure in the glow discharge chamber in order to ensure free mobility of the ions running back and forth in the potential pot from potential pot edge to potential pot edge without energy losses caused by collisions with or ionization of gas molecules. Ionization of gas molecules in the potential pot to a greater extent by the ions running back and forth in the potential pot would moreover also have the disadvantage that the electrons thereby liberated would be accelerated by the potential gradient in the potential pot towards the cathode of the glow discharge chamber, resulting in an additional power loss which would be added to said power loss of the glow discharge chamber, thus at least partially cancelling out the advantage of the high efficiency of a glow discharge chamber with an open cathode, and would in addition lead, as a result of conversion into heat of the kinetic energy of the electrons colliding with the cathode, to an undesirable heating of the cathode and hence to the risk of the glow discharge turning into an arc discharge.

For these reasons, the only practical option is as a rule a glow discharge chamber 37 which is sealed off in a gas-tight manner from the potential pot and has a cathode 39 constructed in the manner of a Lenard window. Admittedly up till now Lenard windows have been known only in cathode-ray tubes for the passage of electrons, while for producing canal rays or for the passage of ions through a cathode up till now, as is known from e.g. mass spectrographs, usually only open or pierced cathodes have been used because ions normally still carry part of the electron sheath of the appropriate atoms or molecules and with said residual electron sheath still have such a large diameter that they cannot pass a cathode constructed in the manner of a Lenard window. However, this is not the case with ions whose electron sheath has been completely removed, such as atomic hydrogen ions $H^+$, atomic deuterium ions $D^+$ and the completely ionised helium ions $He^{++}$ known as $\alpha$ particles. For, as shown, for example, by the attempts of Geiger and Marsden in 1913 roughly to determine the size of atomic nuclei by measuring the scatter of $\alpha$ particles as they pass through thin metal films, $\alpha$ particles or helium nuclei given sufficient speed can with the exception of a low percentage of extremely scattered particles easily pass through thin metal films and the same must naturally also apply to hydrogen and deuterium nuclei which are even smaller than helium nuclei. On the other hand, what cannot pass through such thin metal films are the singly ionized molecular deuterium ions $D_2^+$ which arise in a glow discharge in deuterium gas $D_2$ in the cathode fall along with atomic deuterium ions $D^+$ and whose electron sheath is not completely removed, since the particle size of said molecular deuterium ions $D_2^+$ is around $10^{-8}$ cm and is therefore around $10^5$ times the particle size of $10^{-13}$ cm of atomic deuterium ions $D^+$, and in the present case this is a considerable advantage because molecular deuterium ions reaching the potential pot 22 would decay there, liberating one electron for every two atomic deuterium ions, and the liberated electrons would lead to the additional power loss already mentioned above as well as to heating of the cathode 39 of the glow discharge chamber and hence to the risk of the glow discharge turning into an arc discharge. Admittedly, molecular deuterium ions produced through ionization of deuterium molecules in the potential pot 22 do also lead, both at the time they are produced through ionization and when they subsequently decay into atomic deuterium ions, to the liberation of electrons and hence to such an additional power loss and heating of the cathode 39, but since the potential pot 22 with the rotationally symmetrical cavity 18 takes up only a limited amount of space and so contains only a limited number of deuterium molecules and consequently, without any feed of molecular deuterium ions through the cathode 39 of the glow discharge chamber 37, as a result of the limited number of deuterium molecules in the potential pot 22 only a limited number of electrons may be liberated by molecular deuterium ions arising in the potential pot 22, these problems caused by liberated electrons, such as the described problem of additional power loss and heating of the electrode 39, also only arise for a limited period of time which, by suitably selecting the initial pressure of the deuterium molecules in the potential pot 22, may be timed to occur during the commissioning phase of the fusion reactor 36 so that such problems cannot arise during steady-state operation of the fusion reactor 36 if the glow discharge chamber 37 is sealed off from the potential pot 22 in a gas-tight manner by a cathode 39 constructed in the manner of a Lenard window. Moreover, during the limited period of time during which deuterium molecules in the potential pot 22 are converted by ionization and subsequent decay into atomic deuterium ions, the number of un-ionized deuterium molecules and hence the partial gas pressure of said deuterium molecules in the potential pot 22 continually decreases until the deuterium ions running back and forth in the potential pot 22 (to which are added the deuterium ions arising as a result of ionization of deuterium molecules) cannot ionize any more deuterium molecules so that the way is completely clear for them to move back and forth between the potential pot edges without any energy losses through collisions with or ionization of gas molecules, i.e. with a glow discharge chamber 37 sealed off in a gas-tight manner from the potential pot 22 and having a cathode 39 constructed in the manner of a Lenard window, the vacuum in the potential pot 22 automatically increases during commissioning of the fusion reactor 36 until a completely trouble-free and energy loss-free reciprocating movement of the ions in the potential pot is ensured.

For this reason, in the present fusion reactor 36, the construction of the cathode 39 of the glow discharge chamber 37 in the manner of a Lenard window is ideally suited to the mode of operation of the fusion reactor 36. With a glow discharge chamber 37 having a cathode 39 constructed in the manner of a Lenard window, however, suitable measures have to be taken to ensure that the atomic deuterium ions arising in the cathode fall of the glow discharge, on reaching the cathode, have at least for the most part a high enough speed to be able to penetrate the thin metal film forming the cathode and that furthermore the ratio of the number of deuterium ions penetrating the thin metal film per unit of time, or the ionic current from the glow discharge chamber 37 into the potential pot 22, relative to the number of ions flowing to and not penetrating the cathode 39 of the glow discharge chamber 37 per unit of time, or the current flowing through the glow discharge chamber 37, is such that it does not have a distinctly adverse effect upon the efficiency of the fusion reactor 36, and that the ionic current from the glow discharge chamber 37 into the potential pot 22 is large enough constantly to replace the deuterium ions converted in nuclear fusion reactions in the reaction zone 19 into reaction products (helium, tritium, protons, neutrons) and hence to guarantee a steady-state progression of the fusion process. Suitable measures for this are: operating the glow discharge in the form of a so-called "impeded glow discharge" in the field of the abnormal cathode fall with currents up to 10,000 times the current, which arises in the normal cathode fall with complete covering of the cathode with negative glow discharge light, and voltages in excess of 350 V to achieve a relatively large current flowing through the glow discharge chamber 37 and hence an sufficiently large ionic current from the glow discharge chamber 37 into the potential pot 22; adjusting a relatively low gas pressure in the range of 0.1 to 20 $\mu$bar (or c. $0.75 \times 10^{-4}$ to $1.5 \times 10^{-2}$ torr) in the glow discharge chamber 37 in conjunction with the use of an extremely thin aluminium film with a thickness in the range of 0.5 to 5 $\mu$m as the metal film forming the cathode 39 to achieve a high enough speed for the atomic deuterium ions arising in the cathode fall of the glow discharge for them, on reaching the cathode 39, to be able to penetrate the cathode 39; an anode of the glow discharge chamber 37, which dips into the negative glow discharge light, in conjunction with a voltage between anode and cathode of the glow discharge chamber 37 which is much higher than the voltage to be applied, in the case of an anode which does not dip into the negative glow discharge light, under otherwise identical operating conditions between anode and cathode of the glow discharge chamber, in order to achieve a sufficiently high ratio of the ionic current from the glow discharge chamber 37 into the potential pot 22 to the current flowing through the glow discharge chamber 37; and annular gaps 94 laterally defining the cathode area of the cathode 39 to ensure operation of the impeded glow discharge in the abnormal cathode fall while preventing the glow discharge turning into an arc discharge. Use of the measures outlined above results in a so-called "current-intensive glow discharge" which has been described in detail by its inventor, Bernhard Berghaus, in connection with the penetration of ions into a metal surface operating as a cathode of a current-intensive glow discharge, in patent literature of the 60s and so does not require any more detailed explanation here.

In the present fusion reactor 36, the cathode 39 of the glow discharge chamber 37 comprises a 1 $\mu$m thick aluminium film which is supported by a perforated metal plate 41 serving as a support element and having round holes 0.5 mm in diameter and a total hole cross-section of 70% of the plate area, and the anode 40 formed by the remaining walls of the glow discharge chamber 37 forms with each of the side edges of the cathode 39 or the support element 41 a 0.8 mm wide annular gap 94.

The mode of operation of the nuclear fusion system shown in FIG. 6 is described in greater detail hereinafter with reference to the example of a, technically relatively uncomplicated, small experimental reactor having a gross electric output generated by nuclear fusion of approximately 10 kW and a structure corresponding to the fusion reactor 36 of FIG. 6 to the scale of 2:1, the description relating to the commissioning and steady-state operation of the system.

On commissioning, firstly the entire system shown in FIG. 6, with the exception of the generators 80 and 84, the water/steam circuit 85, the high-current source 62 and the coolant flow source 63, is brought by means of a heat source (not shown in FIG. 6) up to a temperature of 200° C. at which the lithium in the blanket 52 and the remaining lithium circuit 83 changes from the solid to the liquid state and may be set in circulation by means of the lithium pump 67. At the same time, the lithium reservoir 66 is brought by means of a heat source (also not shown in FIG. 6) up to a temperature of 1020° C., after which the lithium pump 67 is switched on so that the lithium in the lithium circuit 83 starts to circulate and shortly afterwards the heat source for heating the system is switched off and cooling of the system to normal temperature is initiated. The lithium set in circulation in the lithium circuit 83 is then circulated at a pumping rate of the lithium pump 67 of 0.5 l/min until the entire lithium circuit 83 including the blanket 52 has heated up to a temperature approaching 1000° C. During this heating phase, the lithium circulating in the lithium circuit 83 gives off heat through the heat exchanger 69 to the potassium circuit 81 and so causes the, during the previous heating of the system to 200° C., liquefied potassium in the heat exchanger 69 acting simultaneously as steam boiler of the potassium circuit 81 to evaporate as soon as the potassium has reached its boiling temperature of above 760° C. dependent upon the vapour pressure in the heat exchanger 69. The resultant potassium vapour then drives the potassium turbine 82 at first at no-load and then gives off its residual thermal energy through the heat exchanger 87 to the water/steam circuit 84 and is subsequently after condensation supplied back to the heat exchanger 69 in liquid form. By means of the heat given off by the potassium circuit 81 through the heat exchanger 87 to the water/steam circuit 85, the water in the heat exchanger 57 acting simultaneously as steam boiler of the water/steam circuit 85 is caused to evaporate as soon as it has reached its boiling temperature of above 100° C. dependent upon the steam pressure in the heat exchanger 87. The steam produced then drives the steam turbine 86 at first at no-load and is then condensed in the condenser 88 and supplied by a pump back to the heat exchanger 87 in liquid form. The actuation of the lithium circuit 81 and the subsequent actuation of the water/steam circuit 85 together take roughly the same length of time as heating of the lithium circuit 83 to around 1020° C. so that, on completion of said heating phase, actuation of the three heat circulation systems 81, 83 and 85 is complete. During said heating phase, the system, initially heated to 200° C., with the exception of the three heat circulation systems 81, 83 and 85 cools back down to a temperature below 50° C. Before the transition into the second commissioning phase of the fusion reactor of FIG. 6 described below, the pumping rate of the lithium pump 67 is increased to 3.25 l/min. Up to the transition into the afore-mentioned second commissioning phase, the energy for actuating the three heat circulation systems 81, 83 and 85 is supplied by said heat source which heats the lithium reservoir 66 up to 1020° C. and keeps it at said temperature.

Instead of heating the entire system to 200° C. during its commissioning, it is possible, particularly in larger nuclear fusion systems, merely to heat the potassium in the potassium circuit 81 to a temperature above 70° C. and to change the lithium in the lithium circuit 83 from a solid to a liquid state by means of electric Joule heat, with the actuation of the three heat circulation systems 81, 83 and 85 subsequently being effected in the same manner as described above. Finally, it is also possible to evacuate the entire lithium circuit 83 at the end of each steady-state operation of the system so that, on commissioning of the system, there is no lithium in the lithium circuit 83 and therefore, right at the start of commissioning, liquid lithium from the lithium reservoir 66 may be circulated by the lithium pump 67 in the lithium circuit 83 (such a way of operating is however not without its problems owing to the need for complete removal from the lithium circuit 83 of the gas located in said circuit when the system is stopped).

After actuation of the three heat circulation systems 81, 83 and 85, the coils 15 are then cooled down into the temperature range of superconductivity to the boiling temperature of helium of around 4.5° K. Said cooling may be effected either directly by means of the liquid helium supplied by the coolant flow source 63 or, especially in larger nuclear fusion systems, in several stages using various liquefied gases of differing boiling temperatures, with it being advantageous in multi-stage cooling to use liquid air in the first stage and then liquid helium in the last stage. In a small experimental reactor like in the present case, however, the technical effort required for multi-stage cooling would be far greater than that for liquid helium which evaporates during cooling of the coils to 4.5° K., especially as the coolant flow source 63 usually includes not only a reservoir for liquid helium but also a reservoir for helium evaporated during cooling and a device for liquefying it, so that the outlay for cooling the coils to 4.5° K. is restricted to the cost of liquefying the helium evaporated during cooling.

After cooling of the coils 15 and of the supply conductors leading thereto to 4.5° K., the magnetic field 16 surrounding the coils 15 and containing the reaction zone 19 is then excited up to an induction of around 8 tesla or 80,000 gauss at the edge of the reaction zone 19 or in front of the portions of the blanket 52 facing the reaction zone 19 by supplying the coils 15 with a coil current $I_s$ which is supplied by the high-current source 62 and continuously rises up to around 20 kA. When using a high-current source 62 with a superconducting output circuit, said coil current of 20 kA and the magnetic field 16 it generates are maintained unaltered during steady-state operation without further energy supply because the electric power losses in superconducting circuits are practically zero and the magnetic energy of the magnetic field 16 cannot therefore in superconducting circuits be converted into Joule heat. If such a high-current source with a superconducting output circuit is unavailable, the energy losses arising at the high internal resistance of the high-current source as a result of conversion of magnetic energy into Joule heat must be compensated either from time to time by pulsed energy supply or continuously by a constant energy supply from the high-current source. In the small experimental reactor described here, a welding generator, whose secondary circuit forms the output circuit of the high-current source connected to the supply conductors to the coils 15, may be used as a high-current source 62.

During excitation of the magnetic field 16, which takes a certain amount of time, the rotationally symmetrical cavity 18 forming the potential pot 22, plus the two channels 48 and 49, the connected gas lines 95 and 96 to the reaction gas reservoir 70 and the vacuum pump 77 and the glow discharge chamber 37 are evacuated by the vacuum pump 77 to a gas pressure of 0.1 μbar (or $0.75 \times 10^{-4}$ torr) to create the purest possible deuterium atmosphere in the potential pot 22 and the glow discharge chamber 37, are then filled with deuterium gas up to a gas pressure of 0.5 bar, evacuated once more to 0.1 μbar, filled again with deuterium gas up to 0.5 bar and finally evacuated at first to 15 μbar, whereupon after disconnection of the glow discharge chamber 37 from the vacuum pump 77 there is a further evacuation of the potential pot 22 up to 1.333 μbar (or $10^{-3}$ torr). For this purpose, first the outputs of the reaction gas reservoir 70 and the deuterium reservoir 73 are closed and the gas line 97 leading to the glow discharge chamber 37 is connected through opening of the valve 98 by the connecting line 99 to the gas line 96, then the first evacuation is carried out by the vacuum pump 77, whereupon the output of the deuterium reservoir 73 is opened and, after the first filling with deuterium gas is complete, is closed again, and then there is the second evacuation by the vacuum pump 77 and then as a result of re-opening the output of the deuterium reservoir 73 the second filling with deuterium gas, and after closure of the output of the deuterium reservoir 73 the third evacuation up to 15 μbar is carried out by the vacuum pump 77 and then the valve 98 is closed and the potential pot 22 is further evacuated to 1.333 μbar, and this vacuum is then maintained in the potential pot by suitably adjusting the vacuum pump 77. In order, during the evacuations and especially the fillings with deuterium gas, to prevent the occurrence of any substantial pressure differences between potential pot 22 and glow discharge chamber 37 and hence any substantial mechanical stresses upon the thin metal film forming the cathode 39 of the glow discharge chamber 37, the speed of said processes should be such as to allow a constant pressure compensation between potential pot 22 and glow discharge chamber 37 during the processes.

On completion of the excitation of the magnetic field 16 and the evacuations and fillings with deuterium gas of the potential pot 22 and glow discharge chamber 37, a glow discharge is then first ignited at the pressure of 15 μbar prevailing in the glow discharge chamber 37. For this purpose, in a direct voltage source 60, an open-circuit voltage of 650 V and a current-voltage characteristic of the voltage source 60 corresponding to an internal resistance of 20 MΩ is adjusted and then a switch (not shown in FIG. 6) in the voltage source 60 is switched on which connects the positive pole of said source to the line 100 leading to the anode 40 of the glow discharge chamber 37 so that in the glow discharge chamber 37 a glow discharge is ignited with a current flowing through the discharge chamber 37 of around 20 μA, said glow discharge being in the region of the upper limit of the normal cathode fall and therefore completely covering the cathode 39 up to the annular gaps 94 and its negative glow discharge light almost filling the entire glow discharge chamber 37 and extending close up to the anode 40. Subsequently, the internal resistance of the voltage source 60 is constantly reduced to 10 kΩ by suitably varying the current-voltage characteristic of the voltage source 60, thereby increasing the voltage between anode 40 and cathode 39 of the glow discharge chamber 37 to around 400 V and the current through the glow discharge chamber 37 to the value of around 25 mA provided for steady-state operation. Under said conditions, however, of the total number of ions colliding with the cathode in the glow discharge, the proportion penetrating the cathode 39 and consequently forming canal rays is still small and is as a rule under 1%, i.e. under 0.25 mA, while for steady-state operation a current formed by the canal rays of around 0.9 mA is required. Admittedly, it would be possible to achieve an appropriate increase in the current formed by the canal rays with an unaltered gas pressure of 15 μbar in the glow discharge chamber 37 by increasing the voltage between anode 40 and cathode 39 of the glow discharge chamber 37 from around 400 V to values above 430 V, thereby increasing the current flowing through the glow discharge chamber 37 to values above 0.1 A, or reducing the internal resistance of the voltage source 60 to values below 2.2 kΩ, but, quite apart from the fact the power loss in the glow discharge chamber 37 would rise to values starting to affect the efficiency of the nuclear fusion system, this option, with a current through the glow discharge chamber 37 substantially higher than 0.1 A, would in any case involve the risk of the glow discharge turning into an arc discharge, which is of course to be avoided at all cost. For this reason, in order to increase the current formed by the canal rays, it is advantageously not the current flowing through the glow discharge chamber 37 but rather the ratio of the current formed by the canal rays to the current flowing through the glow discharge chamber 37 which is to be increased and this is effected by the above-mentioned measure of dipping the anode 40 of the glow discharge chamber 37 into the negative glow discharge light in conjunction with a sufficient increase in the voltage between anode 40 and cathode 39 of the glow discharge chamber 37 to maintain the glow discharge. Such a dipping of the anode into the negative glow discharge light may be achieved either, with an unaltered gas pressure in the glow discharge chamber, by reducing the distance between anode and cathode or, with an unaltered distance between anode and cathode, by reducing the gas pressure in the glow discharge chamber, and since in the present case the distance between anode 40 and cathode 39 of the glow discharge chamber 37 is fixed in advance, after said reduction in the internal resistance of the voltage source 60 to 10 kΩ and the resultant increase in the voltage between anode 40 and cathode 39 to around 400 V and in the current through the glow discharge chamber 37 to 25 mA, the gas pressure in the glow discharge chamber 37 is reduced while at the same time the voltage between anode 40 and cathode 39 of the glow discharge chamber 37 is, by increasing the open-circuit voltage of the voltage source 60, increased to the extent that the current through the glow discharge chamber 37 remains substantially constant at 25 mA. After a continuous reduction in the gas pressure from 15 μbar to 8 μbar and a simultaneous continuous increase in the open-circuit voltage of the voltage source 60 from 650 V to 800 V or in the voltage between anode 40 and cathode 39 of the glow discharge chamber 37 from 400 V to 550 V while keeping the current flowing through the glow discharge chamber 37 constant at around 25 mA during said variations in gas pressure and voltage, there is then attainment of the operating conditions provided for steady-state operation under which there is during operation a current formed by canal rays of the required level of around 0.9 mA.

Thus, all the necessary preliminary measures in terms of commissioning the nuclear fusion system of FIG. 6 have been taken in order to be able to start nuclear fusion.

During the subsequent second phase of commissioning the nuclear fusion system up to the transition to steady-state operation, nuclear fusion reactions are initiated and carried out at first exclusively with deuterium as a reaction gas until there is a sufficient supply of the tritium arising during these reactions or bred during subsequent reactions from neutrons in the lithium blanket 52 to change over in steady-state operation to deuterium and tritium as a reaction gas and ensure a uniform supply to the reactor 36 of tritium which is substantially independent of the average length of time that a tritium atom takes from the moment of its breeding in the lithium blanket 52 to pass through the lithium circuit to the tritium stripper 60 then to pass through the reaction gas reservoir 70 including its dwell time in the reaction zone 19 up to fusion with a deuterium atom and the resultant generation of a corresponding fusion energy and a neutron effecting the breeding of a new tritium atom in the lithium blanket 52.

The beginning of nuclear fusion in said second phase of commissioning is initiated by switching on the high-voltage source 61 by means of a switch (not shown in FIG. 6) and simultaneously opening the output side of the deuterium reservoir 73. Upon opening of the deuterium reservoir 73, molecular deuterium gas at normal temperature and a pressure of 8 μbar is supplied at the rate of around 0.85 l/min through the line 97 to the glow discharge chamber 37 to compensate the deuterium ions flowing off from said chamber in the form of canal rays, and as a result of switching on the high-voltage source 61, a positive voltage of 200 kV is applied through the line 101 to the cathode 39 of the glow discharge chamber 37 forming the upper edge 30 of the potential pot 22 and a positive voltage of 240 kV is applied through the line 102 to the screening electrodes 92 and 93 forming the positive poles of the screening means 43, 45 and 46, compared to the zero potential prevailing in the potential pot centre 24 and at the negative poles of the screening means 43, 45 and 46. The voltage of 240 kV at the two screening electrodes 92 drives a current of 1 mA along the screening means 43 connected to said electrodes as a result of the series connection of the resistances totalling in each case 240 MΩ located between the metal rings 44 of the screening means 43. The individual resistances between the metal rings 44 are so dimensioned as to produce a potential profile along the screening means 43 approximating to the potential profile 28 shown in FIG. 3. Because of said potential profile, the screening means 43 generate inside the potential pot 22 an electric field with a potential profile between the upper potential pot edge 38 and the potential pot centre 24 corresponding approximately to the potential profile 27 of FIG. 3. In a corresponding manner, the voltage of 240 kV at the two screening electrodes 93 drives a current of 0.48 mA along each of the screening means 45 and 46 connected to said electrodes as a result of the series connection of the resistances totalling in each case 500 MΩ located between the metal rings of the screening means 45 and 46, thereby producing a potential profile along the screening means 45 and 46 approximating to the potential profile 28 shown in FIG. 3.

By means of the electric field in the potential pot 22, the deuterium ions supplied at the upper potential pot edge 38 in the form of canal rays are accelerated in the direction of the potential pot centre 24 and begin the process described above of running back and forth in the potential pot 22 from potential pot edge to potential pot edge, passing in each case through the potential pot centre 24. The deuterium ions running back and forth in the potential pot 22 in the very first milliseconds cumulatively ionise over 90% of the approx. $0.7 \times 10^{17}$ deuterium molecules present in the potential pot 22 at the pressure prevailing there of 1.333 μbar and so produce more than $0.9 \times 1.4 \times 10^{17} = 1.26 \times 10^{17}$ atomic deuterium ions, which participate in the back and forth movement in the potential pot 22, as well as a corresponding number of electrons which run towards the upper potential pot edge 38 and flow off through the cathode 39 of the glow discharge chamber 37 and the line 103 to the positive pole of the high-voltage source 61. Of the deuterium ions produced through ionization of deuterium molecules in the potential pot 22, around 9.47% are inside the reaction zone 19 and the remaining 90.53% are in the potential pot 22 outside of the reaction zone 19, and the 9.47% or around $1.2 \times 10^{16}$ deuterium ions being inside the reaction zone 19 result in an ion concentration in the reaction zone 19 of around $3.8 \times 10^{15}/cm^3$ which arises within a few milliseconds after switching on of the high-voltage source 61. The electric current formed by the canal rays, which after the decay of the current surge caused by the electrons flowing off through the line 103 equals the difference between the currents in the lines 100 and 103, is then adjusted in the event of a deviation from said required current value of 0.9 mA by a slight voltage variation, usually less than 15 V, in the voltage between anode 40 and cathode 39 of the glow discharge chamber 37 to a current value of 0.9 mA. The ion concentration in the reaction zone of $3.8 \times 10^{15}/cm^3$ provided for steady-state operation of the reactor 36 and reached within a few milliseconds after switching on of the high-voltage source 61 is held constant by the vacuum pump 77 in that the vacuum pump 77 extracts so many atoms per unit of time from the reaction zone 19 through the channel 49 that the number of atoms located in the reaction zone 19 remains constant. The number of atoms to be extracted per unit of time from the reaction zone 19 to achieve this depends primarily upon the dwell times of the ions running back and forth in the potential pot 22 through the reaction zone 19 on the one hand inside the reaction zone 19 and on the other hand in the potential pot 22 outside of the reaction zone 19 and also upon the nature and quantity of the nuclear fusion reactions occurring in the reaction zone, being initially around $0.35 \times 10^{15}/s$, then rising with increasing dwell times of the ions in the reaction zone 19 first to around $5.75 \times 10^{15}/s$ before changing finally to around $4.75 \times 10^{15}/s$. The reason for the increase in the mean dwell times of the ions in the reaction zone 19 is that a constantly increasing portion of the ions running back and forth in the potential pot 22 is captured in the reaction zone 19 by the magnetic field 16 surrounding the reaction zone 19, and the difference between the number of atoms supplied per unit of time at the upper potential pot edge 38, namely $0.9$ mA$/1.602 \times 10^{-19}$ As $=5.62 \times 10^{15}/s$, and the number of atoms finally discharged per unit of time, namely around $4.75 \times 10^{15}/s$, corresponds to the number of approx. $0.87 \times 10^{15}/s$ neutrons flowing off into the blanket 52 arising per unit of time in nuclear fusion reactions of 2 deuterium ions to one $He^3$ ion and one neutron and nuclear fusion reactions of 2 deuterium ions to one hydrogen ion and one tritium ion and of one tritium ion and one deuterium ion to one $He^4$ ion and one neutron.

The delivery capacity of the vacuum pump 77 required to extract the atoms from the reaction zone 19 is relatively low and ranges with an output pressure of the vacuum pump 77 of around 10 μbar on the output side between 0.085 and 1.6 l/min. It should be added that the extracted atoms, which are additionally ionised as they travel from the reaction zone 19 to the output of the channel 49 and so in overcoming the potential gradient of 240 kV generated by the screening means 46 in the channel 49 lose practically all of their kinetic energy, have at the output of the channel 49 merely a potential energy verging on zero potential but almost no kinetic energy left and so at the output of the channel 49 have a temperature roughly corresponding to normal temperature. The gas delivered by the vacuum pump 77 is supplied to the gas fractionator 74 and is separated there into its components $H_2$, HD, $D_2$, DT and He, of which $H_2$ and HD are supplied to the HD gasometer 76, $D_2$ to the deuterium reservoir 73, DT to the reaction gas reservoir 70 and He to the helium gasometer 75.

In view of the fact that the ion concentration in the reaction zone 19 is not directly measurable, the control of the delivery capacity of the vacuum pump 77 necessary to keep the ion concentration in the reaction zone 19 constant is effected by means of a control signal which responds to the product n.T of the ion concentration n and the temperature T in the reaction zone 19 and is obtained from the difference between the currents in the lines 102 and 104. For the stream of electrons flowing from the zero potential through the line 104 and the current-conducting lithium in the blanket 52 to the above-mentioned non-insulated wall portions of the metal walls of the blanket 52 adjacent to the reaction zone 19 normally flows completely through the screening means 43, 45 and 46 connected to said non-insulated wall portions and through the line 102 to the high-voltage source 61, with the result that the above-mentioned current difference is normally zero provided that no ions from the plasma in the reaction zone 19 reach said non-insulated wall portions and on contact therewith absorb electrons and provided that the plasma pressure n.k.T (k.=Boltzmann's constant) proportional to the product n.T in the reaction zone 19 is lower than the magnetic pressure B.H/2, proportional to the product of the magnetic induction B and the magnetic field strength H of the magnetic field 16 at the edge of the reaction zone 19, upon the plasma in the reaction zone 19. If however the plasma pressure n.k.T exceeds the magnetic pressure B.H/2, a greater number of ions passes from the plasma in the reaction zone 19 to said non-insulated wall portions and there carries a corresponding number of electrons along, which are added to the electron stream in the line 104, thereby producing a current difference between the currents in the lines 102 and 104 which is proportional to the number of ions passing per unit of time from the plasma to the non-insulated wall portions. On occurrence of such a current difference exceeding a specific threshold value, the delivery capacity of the vacuum pump 77 is increased by means of said control signal obtained from the current difference and the ion concentration n in the reaction zone 19 is consequently reduced again unitl the plasma pressure n.k.T is again lower than the magnetic pressure B.H/2 upon the plasma and hence the current difference again drops below the threshold value, and by means of said form of regulating the delivery capacity of the vacuum pump 77 not only the desired constant ion concentration in the reaction zone 19 is achieved but also operation of the reactor with a maximum plasma pressure in the reaction zone 19 corresponding virtually to the magnetic pressure upon the plasma and the resultant optimum operating conditions for nuclear fusion. It should be added, however, that this form of regulating the plasma pressure n.k.T will only work in the intended sense if, with increasing dwell times of the ions in the reaction zone 19, a Maxwell distribution of the speeds of the ions in the reaction zone 19 and a uniform distribution of their kinetic energies over al directions of movement has arisen. Shortly after switching on of the high-voltage source 61 this is, however, not the case because at this stage the deuterium ions in the reaction zone 19 too are mostly still moving in the directions of movement predetermined by the potential gradient in the potential pot 22 substantially into the horizontal mid-plane of the reactor 36 and they have no Maxwell distribution of their speeds but a distribution of their kinetic energies in the range of 0 to 200 keV with a mean kinetic energy of around 150 keV, which is far above the arithmetical range mean of 100 keV because by far the largest portion of the volume of the potential pot 22 lies close to the upper potential pot edge 38 and so the bulk of the deuterium ions arising during the ionization of the deuterium molecules in the potential pot 22 occurring directly after switching on of the high-voltage source 61 are at a potential almost corresponding to the potential of 200 kV at the upper potential pot edge 38 and far above the mean value of the potential of 100 kV in the potential pot 22 and consequently, during the subsequent movement to and fro in the potential pot 22, pass the reaction zone 19 with a kinetic energy far above 100 keV. The plasma pressure n·k·T of 913.3 bar arising in the case of said mean kinetic energy of the ions in the reaction zone 19 of around 150 keV or the equivalent temperature of 1.74 milliard °K. and an ion concentration of $3.8 \times 10^{15}/cm^3$ is then considerably higher than the magnetic pressure B.H/2 upon the plasma of 256 bar arising in the case of the predetermined magnetic induction B of 8 tesla or 80,000 gauss at the edge of the reaction zone 19, with the result that the provided regulation of the plasma pressure would have to respond and by sharply increasing the delivery capacity of the vacuum pump 77 reduce the ion concentration in the reaction zone 19 to around $10^{15}/cm^3$. The reason why this is not however the case is, as already stated, that the directions of movement of the ions shortly after switching on of the high-voltage source 61 are still largely substantially into the horizontal mid-plane of the reactor 36 so that practically no plasma pressure at all arises in the direction of the wall portions of the blanket 52 facing the reaction zone 19 and, moreover, the magnetic induction B in the input and output regions of the ions into and out of the reaction zone 19 located approximately in the horizontal mid-plane of the reactor 36 is because of the additive superimposition of the magnetic fields 16 of the two coils 15 in said regions approximately twice as high as in the edge regions of the reaction zone 19 in front of the wall portions of the blanket 52 lying closest to the centre 24, so that in said regions a magnetic induction of around 16 tesla or 160,000 gauss and a magnetic pressure B.H/2 of around 1024 bar prevails which is greater than said plasma pressure n·k·T of 913.3 bar. With the subsequent increase in the dwell times of the ions in the reaction zone 19 and the resultant transition to a Maxwell distribution of speeds of the ions in the reaction zone 19 and a uniform distribution of their kinetic energy over all directions of movement, there is admittedly a successive increasing plasma pressure of the plasma in the reaction zone 19 in the direction of the wall portions of the blanket 52 facing the reaction zone 19 but, since there is simultaneously heat dissipation from the reaction zone 19 to the blanket 52 mainly in the form of radiant heat which is initially not yet compensated by a corresponding inflow of heat resulting from fusion reactions in the reaction zone 19, simultaneously with said increase in the dwell times of the ions in the reaction zone 19 and the resultant transition to Maxwell speed distribution and uniform energy distribution in all directions of movement the temperature in the reaction zone 19 also drops from the very high initial value of 1.74 milliard °K. to around 480 million °K. until the number of nuclear fusion reactions occurring per unit of time has risen to the extent that the heat inflow to the reaction zone 19 resulting from said nuclear fusion reactions completely compensates the heat dissipation from the reaction zone 19, and at said plasma temperature of around 480 million °K. and with the ion concentration in the reaction zone 19 of around $3.8 \times 10^{15}/cm^3$, the plasma pressure is only around 252 bar and is therefore just below the magnetic pressure of 256 bar prevailing at the points of minimum magnetic pressure upon the plasma.

With regard to the regulation of the delivery capacity of the vacuum pump 77 to a constant plasma pressure n.k.T of around 252 bar just below the magnetic pressure upon the plasma and hence to a constant product n.T of $1.824 \times 10^{24} °K./cm^3$, it should be mentioned that the two variables n and T determining the product n.T are not independent of one another, rather the plasma temperature T is a function $T = f(n)$ of the ion concentration n in the reaction zone 19 as soon as nuclear fusion has set in in the reaction zone 19, with the result that the product n.T = n.f(n) is, after the setting in of nuclear fusion in the reaction zone 19, dependent not upon two independent variables but only upon one variable, namely the ion concentration n in the reaction zone 19, and regulation to a constant product n.T is therefore equivalent to regulation to a specific constant ion concentration in the reaction zone 19, determined by the magnetic pressure upon the plasma, of in the present case $3.8 \times 10^{15}/cm^3$ and the plasma temperature arising from the function $T=f(n)$ of in the present case $4.8 \times 10^{8} °K$. Regulation of the delivery capacity of the vacuum pump 77 is therefore a single-point regulation and in one direction only, since the vacuum pump 77 can only reduce the ion concentration in the reaction zone 19. The reason why said regulation works nonetheless is that the reaction zone 19 is constantly being supplied from the potential pot 22 or the glow discharge chamber 37 with new ions which have to be discharged again from the reaction zone 19 in order to keep the ion concentration in the reaction zone 19 constant, with the result that a constant discharge of ions from the reaction zone 19 is necessary and only the discharge rate is regulated by the regulation system.

Nuclear fusion sets in, in principle, immediately after switching on of the high-voltage source 61 but, because of the so-called mean free path lengths of the deuterium ions up to fusion, it takes around 25 seconds for nuclear fusion with the following three chemonuclear reactions to get fully underway:

$$D+D \rightarrow He^3 + n + 3.2 \text{ MeV}$$

$$D+D \rightarrow T + p + 4.0 \text{ MeV}$$

$$D+T \rightarrow He^4 + n + 17.6 \text{ MeV}$$

In summary, with these chemonuclear reactions, 5 deuterium ions are converted, into an energy of 24.8 MeV, and one H ion, one $He^3$ ion, one $He^4$ ion and two neutrons, with the two neutrons then additionally reacting with the lithium in the blanket 52 in the chemonuclear reaction $$n + Li^6 \rightarrow T + He^4 + 4.8 \text{ MeV}$$

and being converted with 2 $Li^6$ atoms, producing a further energy of 9.6 MeV, into 2 tritium atoms and 2 $He^4$ atoms, so that from the 5 deuterium atoms a total energy of 34.4 MeV is directly and indirectly generated or each pair of deuterium ions generates on average 13.76 MeV of energy.

Said energy, of which 72.1% arises in the reaction zone 19 and 27.9% in the lithium in the blanket 52, is discharged for the most part in the form of thermal energy from the lithium stream in the blanket 52 and leads, roughly one to two minutes after switching on of the high-voltage source 61, to a temperature difference of around 14.4° C. between the lithium in the collecting tank 54 and the lithium in the storage tank 53 which, at the flow rate of the lithium of 3.25 l/min set prior to the beginning of the second commissioning phase, corresponds to a gross electric output of around 2400 W. In comparison to this, the above-mentioned $4.75 \times 10^{15}$ ions extracted per second by the vacuum pump 77 from the reaction zone 19 through the channel 49 carry only the relatively low energy of 216 Ws or a corresponding output of 216 W, which in terms of harnessing does not justify the technical outlay for the above-mentioned optional magnetohydrodynamic generator 78. In the present embodiment, said energy carried by the ions extracted through the channel 49 may however be harnessed directly in a simple manner because the ions, as already stated above, are roughly at normal temperature at the output of the channel 49 and have only a potential energy corresponding to the potential drop in the channel 49 of 240 kV which, by neutralising the ions at the output of the channel 49 (e.g. by means of a truncated cone-shaped, porous electrode connected to the line 105, disposed upstream of the channel output in the region of the screening electrode 93 and isolated from said screening electrode and sealing off the channel in the manner of a bottle stopper), may be directly extracted as electric energy and indirectly harnessed for the power supply to the screening means 43, 45 and 46 (as a result of which the power consumption of the screening means in the second commissioning phase is reduced initially by about 30% and then, after reduction of the voltages of the high-voltage source 61 from 240 and 200 kV to 96 and 80 kV and during steady-state operation, even by about 76%). Furthermore, this form of harnessing the energy of the ions extracted from the reaction zone 19 also furnishes a check-back signal for checking the accuracy of the above-mentioned control signal used to regulate the delivery capacity of the vacuum pump 77, because the current in the line 105 must normally, if no ions reach said non-insulated wall portions of the blanket 52 or the screening means 43, 45 and 46, be equal to the difference between the currents in the lines 100 and 103 and therefore a check-back signal which is normally zero may be derived from the difference between the current in the line 105 and the current difference between the currents in the lines 100 and 103.

The thermal output of about 2400 W removed from the reactor 36 by the lithium circulating in the lithium circuit 83 is then transferred through the heat exchanger 69 to the potassium circuit 81 where it is partly supplied to the potassium turbine 82 and converted by it and the connected generator 80 into electric power and partly transferred through the heat exchanger 87 to the water/steam circuit 85 where it is supplied to the steam turbine 86 and converted by it and the connected generator 84 into electric power. Since the efficiency of such conversions of thermal energy into electric energy is however known to be relatively poor and generally not much above 33%, the generators 80 and 84 together only produce a net output of around 800 W of electric power.

Compared to said generated electric power of about 800 W there is however an internal consumption of electric power which, with initial voltages of the high-voltage source 61 of 200 kV for the canal rays and 240 kV for the screening means (even with harnessing of the energy of the ions extracted from the reaction zone 19), is around 675 W for the canal rays and screening means alone so that, taking into account the power consumption of the other supply equipment, in the second phase of commissioning the fusion reactor 36 there is initially still an extremely negative power balance. In order to improve this and at least in the remaining part of the second commissioning phase to arrive at an at least slightly positive power balance, about 2 to 3 minutes after switching on of the high-voltage source 61, when nuclear fusion in the reaction zone 19 is fully underway and has been stable for some time so that the high potential drop in the potential pot 22 initially required to initiate nuclear fusion is no longer needed, the voltages $U_i$ and 1.2 $U_i$ supplied by the high-voltage source 61 are reduced to the voltage values of 80 kV and 96 kV provided for steady-state operation, thereby reducing the power consumption of the high-voltage source 61 for the canal rays and the screening means (with harnessing of the energy of the ions extracted from the reaction zone 19 by means of said porous electrode) to around 100 W, so that compared to the generated electric power of around 800 W, with a power consumption of the other supply equipment of the reactor 36 of around 470 W, there is an internal power consumption of around 570 W and the generators 80 and 84 may therefore supply, in addition to the internal power consumption, an output of 230 W to external consumers.

Said power gain of 230 W, or only 9.58% of the generated thermal output of 2400 W during the second phase of commissioning the nuclear fusion system of FIG. 6, would naturally be far too low to justify the relatively high technical outlay for the nuclear fusion system but, as already stated above, the purpose of the second commissioning phase is not energy production but primarily the breeding of a sufficient supply of tritium to be able then to run the fusion reactor 36 in steady-state operation using deuterium and tritium as a reaction gas. The relatively low power gain with exclusive use of deuterium as a reaction gas demonstrates, however, that steady-state operation of the reactor 36 exclusively with deuterium as a reaction gas would not be practicable unless the intention was to use the reactor not to produce electric power but merely to breed currently still highly expensive tritium and to use not the extracted electric energy but the extracted tritium as the product of the reactor.

After the reduction in the voltages of the high-voltage generator 61 to 80 kV and 96 kV, the second phase of commissioning the reactor 36 then continues for about 60 hours with unaltered operating data, i.e. with an ion concentration in the reaction zone 19 of around $3.8 \times 10^{15}/cm^3$, a temperature in the reaction zone 19 of about 480 million °K., a plasma pressure in the reaction zone 19 of around 252 bar, a potential gradient in the potential pot 22 of 80 kV, an electric current formed by the canal rays of 0.9 mA, a current flowing through the glow discharge chamber 37 of 25 mA, a voltage lying across the anode-cathode link of the glow discharge chamber 37 of 550 V±2.75%, a continuous deuterium supply to the glow discharge chamber 37 of 0.85 l/min molecular deuterium gas at a pressure of 8 μbar and normal temperature, a voltage across the screening means 43, 45 and 46 of 96 kV and a total current through the latter of 1.184 mA, a lithium stream driven by the lithium pump 67 through the lithium circuit 83 of 3.25 l/min, a temperature of the lithium in the storage tank 53 of around 990° C., a temperature difference between the lithium in the collecting tank 54 and the lithium in the storage tank 53 of 14.4° C., a current through the coils 15 of 20 kA and a delivery capacity on the output side of the vacuum pump 77 of around 0.74 l/min of a gas mixture comprising approximately half deuterium molecules, a third helium atoms and a sixth hydrogen deuterium molecules at a pressure of 10 μbar. The gas mixture delivered by the vacuum pump 77 additionally contains hydrogen molecules and tritium deuterium molecules but the content of said substances is very low because the probability of hydrogen molecule formation in a gas mixture comprising ⅚ deuterium atoms and only ⅙ hydrogen atoms is, at around 1.5%, extraordinarily low and at the temperature of 480 million °K. the life of an individual tritium atom arising in a D-D reaction in the reaction zone 19 up to its D-T reaction with a deuterium ion in the reaction zone 19 is on average shorter than the time required for it to escape from the reactor, unless the tritium ion happens to be located in front of the transition of the reaction zone 19 into the channel 49 and happens to have a precisely vertical direction of movement upwards and happens also to have sufficient kinetic energy to overcome the potential barrier of 96 kV in the channel 49. Of the extremely low percentages of molecular hydrogen and molecular deuterium tritium in the gas mixture delivered by the vacuum pump 77, the molecular hydrogen is supplied by the gas fractionator 74 together with the molecular hydrogen deuterium to the HD gasometer 76 and the molecular deuterium tritium is supplied through the line 106 to the reaction gas reservoir 70 and is fed back from there through the line 95 directly into the reactor 36.

After said 60 hours have elapsed, around 1 mg of tritium has then collected in the tritium reservoir 72, said tritium originating from said reaction occurring in the blanket 52

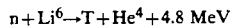

$$n + Li^6 \rightarrow T + He^4 + 4.8 \text{ MeV}$$

and being separated during said 60 hours by the tritium stripper 68 from the lithium coming from the reactor 36 and passed on to the tritium reservoir 72, and said 1 mg of tritium constitutes a sufficient supply of tritium to change over then to deuterium and tritium as a reaction gas and hence to be able to initiate steady-state operation of the fusion reactor 36.

Initiation of steady-state operation is effected in principle in that tritium atoms are supplied from the reaction gas reservoir 70 through the channel 48 to the reaction zone 19 in the same quantity per unit of time as deuterium ions flowing to it from the deuterium reservoir 73 through the line 97 and the glow discharge chamber 37 as well as the potential pot 22, thereby creating in the reaction zone 19 a reaction gas atmosphere initially made up in equal parts of deuterium and tritium in which deuterium ions and tritium ions react with one another in the chemonuclear reaction

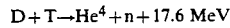

$$D + T \rightarrow He^4 + n + 17.6 \text{ MeV}$$

and are converted, producing an energy in each case of 17.6 MeV, into one He⁴ ion and one neutron per D-T reaction, with the neutron then additionally reacting with the lithium in the blanket 52 in the chemonuclear reaction

$$n + Li^6 \rightarrow T + He^4 + 4.8 \text{ MeV}$$

and being converted with an Li⁶ atom, producing a further energy of 4.8 MeV, into one tritium atom and one helium atom, with the result that each pair comprising one deuterium ion and one tritium ion directly and indirectly generates 22.4 MeV of energy.

At said transition from the D-D reactions predominantly occuring in the second phase of commissioning the reactor 36 to the D-T reactions occurring almost exclusively during steady-state operation of the reactor 36, the 5 l capacity reaction gas reservoir 70, which during the second phase of commissioning the reactor 36 was switched for unimpeded throughflow, is first closed on the output side and filled with molecular tritium from the tritium reservoir 72 up to a pressure of 8 μbar and is then further continuously supplied with 0.34 l/min of molecular tritium of a pressure of 10 μbar corresponding approximately to $1.405 \times 10^{15}/s$ of tritium molecules from the tritium reservoir 72, and as soon as the gas pressure in the reaction gas reservoir 70 has reached the pressure value of 8 μbar, the output of the reaction gas reservoir 70 is again opened wide enough for at first around 1.36 l/min of molecular tritium gas at a pressure of 5 μbar corresponding to around $2.81 \times 10^{15}$/s tritium molecules or $5.62 \times 10^{15}$/s tritium atoms to be supplied from the reaction gas reservoir 70 through the line 95 to the reactor 36, in other words as many tritium atoms per unit of time as deuterium atoms. Since the tritium molecules fed to the reactor 36 through the line 95, on entry into the reaction zone 19 and to some extent while still in the channel 48, are split into tritium atoms and ionised, as a result of the increase in the ions supplied to the reaction zone 19 by one tritium ion per supplied deuterium ion, the previous ion concentration n in the reaction zone 19 of $3.8 \times 10^{15}$/cm$^3$ is doubled to $7.6 \times 10^{15}$/cm$^3$, while at the same time the temperature T in the reaction zone 19 owing to the supply of the tritium molecules at normal temperature or in the "cold" state is halved from its previous level of 480 million °K to 240 million °K. For reasons explained in greater detail below, in the first five to ten minutes after the start of supply of the tritium the ion concentration n in the reaction zone then continues to rise up to around $8.8 \times 10^{15}$/cm$^3$ and the temperature T in the reaction zone 19 simultaneously drops to around 208 million °K. The product n.T and hence the plasma pressure n.k.T in the reaction zone 19 remains constant at around 252 bar owing to the increase in the ion concentration n to a level initially twice and then 2.34 times its previous level and the drop in the temperature T to a level initially half then 0.427 times its previous level, but the length of time from the birth or entry of an individual tritium atom in the reaction zone 19 up to a D-T reaction with a deuterium ion which, in the temperature range of 200 to 500 million °K, is inversely proportional to the temperature T to the power of 3.5 and is also inversely proportional to the ion concentration n in the reaction zone $$t \sim \frac{1}{n \cdot T^{3.5}} \sim \frac{1}{(n \cdot T) \cdot T^{2.5}}$$

increases with said drop in the temperature T to around 208 million °K roughly by the factor 8.09 and therefore becomes greater than the previously mentioned length of time required for a tritium atom to escape from the reactor 36, with the result that only about half of the tritium atoms or ions supplied to the reaction zone 19 achieve D-T reaction with deuterium ions and the other half may escape beforehand from the reactor 36 through the channel 49. And since the probability of D-D reactions at a temperature of around 200 million °K is negligibly low compared to the probability of D-T reactions and therefore it is practically exclusively D-T reactions which occur in the reaction zone 19 and use in each case one deuterium ion and one tritium ion, then, given the same number of deuterium ions and tritium ions supplied per unit of time and the same number of deuterium ions and tritium ions used for D-T reactions in steady-state operation per unit of time, it follows that the same number of deuterium ions as tritium ions, i.e. half of the deuterium ions supplied from the glow discharge chamber 37, escape from the reactor 36 without having achieved fusion reaction. Of the deuterium and tritium ions achieving D-T reaction in the reactor 36, i.e. the other half of the deuterium and tritium ions supplied to the reactor 36 from the glow discharge chamber 37 and the reaction gas reservoir 70, there is produced in D-T reactions, besides neutrons flowing off in the blanket 52, per unit of time roughly the same number of He$^4$ ions likewise escaping in steady-state operation from the reactor as the number of deuterium ions escaping from the reactor or the number of tritium ions escaping from the reactor, with the result that initially, after a running-in period of one to two minutes after the start of supply of the tritium, a gas comes from the reactor 36 or is extracted by the vacuum pump 77 through the line 96 which is formed in roughly equal parts by a third each of helium ions, deuterium ions and tritium ions which escape from the reactor 36 and are neutralised in the output region of the channel 49 (e.g. by means of the above-mentioned porous electrode). During said neutralisation, normal chemical reactions are produced between the deuterium and tritium atoms arising from the ions and lead to the formation of one deuterium molecule, two deuterium tritium molecules and one tritium molecule from each four deuterium atoms and four tritium atoms, with the result that the gas extracted from the reactor 36 by the vacuum pump 77 initially contains for each four helium atoms one $D_2$ molecule, two DT molecules and one $T_2$ molecule or is made up half of helium atoms, quarter of deuterium tritium molecules and one eighth each of deuterium molecules and tritium molecules. The delivery capacity of the vacuum pump 77 required to extract said gas, namely initially around 1.36 l/min at the output of the vacuum pump at an initial pressure of 10 μbar, is automatically adjusted on the basic of the above-mentioned regulation of the delivery capacity of the vacuum pump 77. The gas delivered by the vacuum pump is separated in the gas fractionator 74 into its components of which the helium is supplied to the helium gasometer 75, the deuterium $D_2$ to the deuterium reservoir 73 and the tritium $T_2$ and the deuterium tritium DT through the line 106 to the reaction gas reservoir 70. Since all of the tritium contained in the gas coming from the reactor 36 is fed back by the vacuum pump 77 and the gas fractionator 74 into the reaction gas reservoir 70 and from there through the line 95 back into the reactor 36, only as much tritium need be supplied to the reactor 36 from the tritium reservoir 72 through the reaction gas reservoir 72 and the line 95 as is converted in the reactor 36 with deuterium in DT reactions into helium and neutrons, i.e. in the case of $2.81 \times 10^{15}$/s deuterium ions achieving DT reaction in the reactor 36 corresponding to half the $5.62 \times 10^{15}$/s deuterium ions supplied to the reactor 36 from the glow discharge chamber 37, $2.81 \times 10^{15}$/s tritium atoms or the $1.405 \times 10^{15}$/s tritium molecules already mentioned above. With the number of DT reactions per unit of time remaining constant, the tritium supply to the reactor 36 also remains constant while, on the other hand, the deuterium supply to the reactor 36 rises continuously during the first five to ten minutes after the start of the tritium supply because the deuterium supply to the reactor 36 from the reaction gas reservoir 70, arising from the formation of deuterium tritium molecules in the output gas of the reactor 36 and from the supply of said DT molecules owing to their tritium content to the reaction gas reservoir 70, is added to the deuterium supply remaining constant with respect to time from the glow discharge chamber 37 and, with said increase in the deuterium supply to the reactor 36, the quantities of $T_2$ gas contained in the output gas of the reactor 36 decrease and those of $D_2$ and DT increase until the number of deuterium atoms contained in $D_2$ molecules in the output gas of the reactor 36 and separated with said molecules by the gas fractionator 74 per unit of time from the output gas of the reactor 36 equals the number of deuterium ions supplied to the reactor 36 per unit of time from the glow discharge chamber 37 and not achieving fusion reaction in the reactor 36, and with the around $2.81 \times 10^{15}$/s deuterium ions not achieving fusion reaction in the reactor this is then the case when the output gas of the reactor contains around $1.405 \times 10^{15}$/s corresponding to around 21.6% $D_2$ molecules, around $1.736 \times 10^{15}$/s corresponding to around 26.8% DT molecules, around $0.537 \times 10^{15}$/s corresponding to around 8.3% $T_2$ molecules and around $2.81 \times 10^{15}$/s corresponding to around 43.3% helium atoms, and around 65.8% $T_2$ molecules and 34.2% DT molecules are located in the reaction gas reservoir 70, and around $3.68 \times 10^{15}$/s molecules with 65.8% $T_2$ and 34.2% DT are supplied from the reaction gas reservoir through the line 95 to the reactor 36. As soon as said state has been reached roughly five to ten minutes after the start of the tritium supply to the reactor 36, the self-regulating delivery capacity of the vacuum pump 77 has increased from the initial level of about 1.36 l/min at the output of the vacuum pump 77 at a pressure of 10 μbar to about 1.57 l/min at the same pressure, the gas fractionator 74 supplies around 0.55 l/min of a gas mixture composed of 76.4% deuterium tritium molecules and 23.6% molecular tritium at a pressure of 10 μbar through the line 106 to the reaction gas reservoir 70 and the reaction gas reservoir 70 contains 5 l of a gas mixture composed of 65.8% molecular tritium and 34.2% deuterium tritium molecules at a pressure of about 9.5 μbar and, if the setting of its output valve is unchanged, supplies around 1.36 l/min of said gas mixture at a pressure of 6.6 μbar through the line 95 to the reactor 36.

With regard to the relatively low pressure of only 6.6 μbar at which the reaction gas coming from the reaction gas reservoir 70 is introduced at the input of the channel 48 into the reactor, it should be noted that the pressure at this point of introduction is, despite the very high pressure in excess of 250 bar in the reaction zone 19, practically zero because the atoms located in the reaction zone 19 are ionized and the ionized atoms passing from the reaction zone 19 into the channel 48 completely lose the kinetic energy they carry from the reaction zone 19 as they move towards the input of the channel 48 against the gradient of the potential of 96 kV generated by the screening means 45 in the channel 48 and do not reach the input of the channel 48 but turn back before this point after losing all their kinetic energy and are accelerated back towards the reaction zone 19, with the result that at the input point of the channel 48 there is no counterpressure at all and the reaction gas may therefore be introduced at the input of the channel 48 at any low pressure. When the gas molecules of the reaction gas move away from the input of the channel 48 into the channel 48, some of them collide there with ions, which have passed from the reation zone 19 into the channel 48, and are split into atoms and ionized and are then moved by the potential gradient generated by the screening means 45 in the channel 48 towards the reaction zone 19, with the electrons liberated during said ionisation flowing off to the screening electrode 93 located in the input region of the channel 48, and the other gas molecules of the reaction gas not colliding with ions in the channel 48 and so not receiving any momentum in a backward direction towards the input of the channel 48 pass through the channel 48 until, shortly before entry into the reaction zone 19, the gas molecules are ionized by high temperatures and the resultant ions are moved on by the potential gradient to the reaction zone 19 where, through collisions with other ions, they are brought to the temperature prevailing in the reaction zone 19. Since, at the end of said five to ten minutes after the start of the tritium supply, the above-mentioned $3.68 \times 10^{15}$/s $T_2$ and DT molecules are supplied from the reaction gas reservoir 70 to the reactor 36 and said molecules after entering the channel 48 up to entry into the reaction zone 19 are split into $7.36 \times 10^{15}$/s atoms and converted by ionization into $7.36 \times 10^{15}$/s ions, so that around $7.36 \times 10^{15}$/s ions from the reaction gas reservoir 70 and around $5.62 \times 10^{15}$/s ions from the glow discharge chamber 37, i.e. a total of $12.98 \times 10^{15}$/s ions, are supplied to the reaction zone 19, whereas initially directly after the start of tritium supply around $5.62 \times 10^{15}$/s ions from the glow discharge chamber 37 and the same quantity of around $5.62 \times 10^{15}$/s ions from the reaction gas reservoir 70, i.e. a total of $11.24 \times 10^{15}$/s ions, were supplied to the reaction zone 19, the ion concentration n in the reaction zone 19, which rose directly after the start of the tritium supply to the above-mentioned $7.6 \times 10^{15}$/cm$^3$, increases during said five to ten minutes after the start of tritium supply again in the ratio 12.98:11.24 to around $8.8 \times 10^{15}$/cm$^3$ and the temperature T in the reaction zone 19, which directly after the start of the tritium supply dropped to the above-mentioned 240 million °K, simultaneously drops during said five to ten minutes after the start of the tritium supply again in the ratio 11.24:12.98 to around 208 million °K on account of the increased percentage of cold ions coming from the reaction gas reservoir 70 in the total number of ions supplied per unit of time to the reaction zone 19 and the process described above for keeping the product n.T constant through appropriate regulation of the delivery capacity of the vacuum pump 77.

At the end of said five to ten minutes after the start of the tritium supply, on reaching the state where all the deuterium originating from the glow discharge chamber 37 and achieving fusion in the reaction zone 19 is supplied by the vacuum pump 77 and the gas fractionator 74 to the deuterium reservoir 73, the process of initiating steady-state operation of the reactor 36 is complete and steady-state operation of the reactor 36 may then continue indefinitely with the operating data adjusted on reaching said state, i.e. with an ion concentration in the reaction zone 19 of around 208 million °K, a plasma pressure in the reaction zone 19 of around 252 bar, a potential drop in the potential pot 22 of 80 kV, an electric current formed by the canal rays of 0.9 mA, a current flowing through the glow discharge chamber 37 of 25 mA, a voltage across the anode-cathode link of the glow discharge chamber 37 of 550 V ±2.75%, a continuous deuterium supply to the glow discharge chamber 37 of 0.85 l/min molecular deuterium gas at a pressure of 8 μbar and normal temperature, a voltage across the screening means 43, 45 and 46 of 96 kV and a current through said means totalling 1.184 mA, a lithium stream driven by the lithium pump 67 through the lithium circuit 83 of 3.25 l/min, a temperature of the lithium in the storage tank 53 of around 990° C., a temperature difference between the lithium in the collecting tank 54 and the lithium in the storage tank 53 of 60° C., a current through the coils 15 of 20 kA, a delivery capacity on the output side of the vacuum pump 77 of around 1.57 l/min of a gas mixture comprising deuterium molecules, deuterium tritium molecules, tritium molecules and helium atoms in the proportions of 21.6% D$_2$, 26.8% DT, 8.3% T$_2$ and 43.3% He at a pressure of 10 μbar and a supply of around 1.36 l/min of a gas mixture comprising tritium molecules and deuterium tritium molecules in the proportions of 65.8% T$_2$ and 34.2% DT at a pressure of around 6.6 μbar from the reaction gas reservoir 70 to the reactor 36. To maintain steady-state operation of the reactor 36 for an unlimited period of time, all that is required is the intermittent supply of nuclear fuels to the reactor 36, i.e. to the deuterium reservoir 73 and the lithium reservoir 66 in the reactor 36, but all this involves per annum is approx. 0.3 g deuterium and 0.88 g lithium so that it is also possible to store enough deuterium and lithium in advance in the deuterium reservoir 73 and the lithium reservoir 66 to last the entire life of the reactor 36 and so topping up with deuterium and lithium during steady-state operation of the reactor 36 is not absolutely essential.

Of the energy generated by the reactor 36 after the induction phase in steady-state operation and originating from the above-mentioned chemical reactions.

$$D + T \rightarrow He^4 + n + 17.6 \text{ MeV}$$

and $$n + Li^6 \rightarrow T + He^4 4.8 \text{ MeV}$$

with the total equation $$D + Li^6 \rightarrow 2He^4 + 22.4 \text{ MeV}$$

78.6% arises in the reaction zone 19 and 21.4% in the lithium in the blanket 52 and said energy is for the most part carried off in the form of thermal energy from the lithium stream in the blanket 52 and leads after the induction phase to a temperature difference of around 60° C. between the lithium in the collecting tank 54 and the lithium in the storage tank 53 which, with the adjusted flow rate of the lithium of 3.25 l/min, corresponds to a gross electric output of around 10 kW.

The thermal output of around 10 kW carried off from the reactor 36 by the lithium circulating in the lithium circuit 83 is, as in the second commissioning phase described above, transferred through the heat exchanger 69 to the potassium circuit 81 where it is partly supplied to the potassium turbine 82 and converted by it and the connected generator 80 into electric power and partly transferred through the heat exchanger 87 to the water/steam circuit 85 where it is supplied to the steam turbine 86 and converted by it and the connected generator 84 into electric power, thereby producing, with an efficiency of said conversion of thermal energy into electric energy of 33%, a net total output from the generators 80 and 84 of around 3.3 kW of electric power. If the above-stated internal power consumption of the nuclear fusion system of FIG. 6 of around 570 kW is deducted from said net electric output of 3.3 kW, the power gain is then around 2.73 kW or 27.3% of the generated thermal output of 10 kW which, for a nuclear power station as well as for a thermal station run on fossil fuels, is a not particularly high, but still acceptable power gain.

Naturally, such a power gain of 2.73 kW considered in the absolute would be far too small to justify the industrial outlay for the nuclear fusion system of FIG. 6, with the result that such a nuclear fusion system would have to be designed to a much larger scale than the embodiment described here for it to be used as a nuclear power station for the production of electric energy, but the purpose of the present embodiment was not energy production itself but a demonstration of the possibility of producing energy by controlled nuclear fusion and, for such a demonstration, a small experimental reactor as in the described embodiment is perfectly adequate. Apart from this, the embodiment was kept small to keep the cost of realising it within affordable limits and to afford research institutes the opportunity of verification by keeping the outlay within their financial capabilities. To reduce outlay, the conventional part of the nuclear fusion system of FIG. 6, i.e. the potassium circuit 81 and the water/steam circuit 85 with the two turbines 82 and 86 and the two generators 80 and 84 may be omitted and the heat exchanger 69 replaced by a cooler with air cooling and measuring instruments for measuring the air quantity flowing through the cooler and the heating of said air quantity, and furthermore, for such verification, the gasometers 75 and 76 may be omitted and a simpler gas fractionator used which strips only the tritium-containing components of the gas delivered by the vacuum pump 77 and supplies them to the line 106. Finally, it is also possible, as already mentioned, to use a conventional welding generator for the high-current source 62 and a cooling unit from superconductivity research for the coolant flow source 63, so that the technical outlay for such verification is virtually restricted to the manufacture of the reactor 36 itself and so, given the small size of the experimental reactor described, should also be within the financial range of smaller research institutes.

What is claimed is:

1. Fusion reactor comprising a reaction zone, a magnetic field with magnetic flux lines surrounding the reaction zone, the magnetic flux lines being curved convexly seen from the reaction zone in the nearer surrounding of the reaction zone,
   an electric potential pot formed by an electric field surrounding the reaction zone for conversion of kinetic energy of ionized reactants escaping from the reaction zone into potential energy thereof and for subsequent return of the ionized reactants into the reaction zone with reconversion of their potential energy into kinetic energy,
   an ion source in an upper area of the electric potential pot distributed over a ringlike-shaped area surrounding the reaction zone, wherein the reaction zone is positioned in a center region of the electric potential pot surrounding the reaction zone, the portions of the magnetic flux lines extending within the electric potential pot in the region between the upper area of the electric potential pot and the reaction zone run substantially perpendicularly to equipotential lines of the electric field forming the electric potential pot, and
   the electric potential pot comprises at least an electrode in its upper area and at least an electrode in its bottom area in the nearer surrounding of the reaction zone being heated to a temperature within an upper part of the temperature range of liquidity of lithium.

2. Fusion reactor according to claim 1 wherein to the upper area of the potential pot ionized reactants are supplied and accelerated by the potential difference between the electrodes in the upper and the bottom area of the potential pot up to a kinetic energy sufficient for fusion and upon not meeting another reactant in the reaction zone pass the center at a high speed corresponding to their kinetic energy and at the opposite side of the potential pot to their supply side again run against the potential difference at a decreasing speed towards the upper area of the potential pot until their kinetic energy, shortly before reaching the electrode in the upper area of the potential pot, is again converted into potential energy, so that the process of accelerated movement towards the bottom area of the potential pot and the subsequent decelerated movement towards the upper area of the potential pot may be repeated any number of times up to a fusion reaction in the reaction zone and consequently a large portion of the reactants supplied to the upper area of the potential pot may be brought into fusion reaction.

3. Fusion reactor according to claim 1 comprising means for supplying the reactor with a reaction gas consisting at least partially of deuterium and for ionizing and supplying said gas to the reactor in the upper area of the potential pot.

4. Fusion reactor according to claim 3 wherein the means for ionizing and supplying the reaction gas to the reactor comprise a glow discharge chamber in the upper area of the potential pot being provided for supplying ionized reactants to the potential pot in form of canal rays, with a cathode designed in the manner of a Lenard tube and comprising a metal film being permeable to the canal rays.

5. Fusion reactor according to claim 4 comprising means for generating a so-called Berghaus current-intensive glow discharge in the glow discharge chamber.

6. Fusion reactor according to claim 1 wherein the electric potential pot has substantially the form of a rotationally symmetrical cavity having a cross-section substantially in the form of two opposing sectors of a circle, with the cusps of the two sectors which form the cross-section coinciding with the axis of symmetry of the rotationally symmetrical cavity and a median dividing said two sectors each into two identical parts standing vertically on said axis of symmetry and said upper area of the electric potential pot lying in the region of the arc of the sectors.

7. Fusion reactor according to claim 6 wherein the apex angle of the sectors is between 10° and 80°.

8. Fusion reactor according to claim 6 comprising at the substantially cone-shaped side surfaces of the rotationally symmetrical cavity spatially defining the electric potential pot, means for lateral electric screening of the potential pot as well as for achieving a potential profile along the screening which is higher than or approximately the same as the potential profile along said median depending upon the distance from the potential pot center.

9. Fusion reactor according to claim 8 wherein the means for screening and for achieving said potential profile comprise stacked rings consisting of an electrically conducting material, each of which being substantially in the shape of a short truncated cone and fits on top of the preceding ring in the stack in such a way that the ring edges of all the stacked rings together define at one side one of said substantially cone-shaped side surfaces of the rotationally symmetrical cavity.

10. Fusion reactor according to claim 9 wherein the rings are electrically insulated from one another, by means of electrically non-conducting coatings and are individually connected to direct voltage sources each supplying the intended potential of the ring.

11. Fusion reactor according to claim 9 wherein the rings are electrically connected to one another by high-resistance resistors formed by electrically poorly conducting coatings and means are provided for generating a current flowing through the stack and producing at the high-resistance resistors the voltage drops required for said potential profile.

12. Fusion reactor according to claim 1 comprising, for generating the magnetic field surrounding the reaction zone, two coils with a substantially triangular winding cross-section disposed coaxially to the reaction zone and to the potential pot on either side of the reaction zone and the potential pot, with coil currents of at least approximately the same magnitude flowing in opposite directions through said coils.

13. Fusion reactor according to claim 12, comprising, for increasing the magnetic field strength in the reaction zone and in particular between the reaction zone and the material walls surrounding it, a substantially hollow sphere-shaped reactor shell enclosing the coils and the potential pot and consisting of a ferromagnetic material one side of the substantially triangular winding cross-section of the coils being adjacent to the reactor shell inner wall and extending approximately parallel thereto, and a linear extension of the median between the other two sides of the triangular winding cross-section extending through the center of the reaction zone.

14. Fusion reactor according to claim 12 wherein the coils are superconducting coils comprising tubular windings with a cooling medium formed by a liquefied gas flowing through the windings and keeping the current-conduction walls of said tubular windings at a temperature within the superconductivity range of the material of said walls, comprising means for supplying the cooling medium to the coils and heat insulating means for each of the two coils.

15. Fusion reactor according to claim 12 wherein the substantially triangular winding cross-section of the coils has substantially the form of an equilateral triangle and the windings of the coils are formed by tubular conductors whose line cross-section likewise has the external shape of an equilateral triangle, and wherein the median between the two triangle sides, pointing approximately toward the reaction zone, of the substantially triangular winding cross-section of the coils makes an angle in the region of 30° to 55°, with the axis of the coaxially arranged coils.

16. Fusion reactor according to claim 1 comprising, for capture and chemonuclear conversion of neutrons liberated in nuclear fusion reactions, a blanket surrounding the reaction zone and the potential pot in which liquid blanket lithium flows from a storage tank, disposed in the region of the upper area of the potential pot and covering the potential pot in this region, along the side surfaces of the potential pot into the region surrounding the reaction zone and from there approximately in the direction of the axis of reaction zone and potential pot into a collecting tank, and wherein the collecting tank is connected to the storage tank over a tritium stripper and a first heat exchanger and a lithium pump for circulating the liquid lithium through the blanket.

17. Fusion reactor according to claim 16 wherein the flow cross-section for the liquid lithium is at least approximately constant in the portions of the blanket extending along the side surfaces of the potential pot and approximately in the direction of the axis of reaction zone and potential pot in order to achieve a substantially constant flow rate of the lithium in said portions of the blanket and wherein the width of the, in said portions of the blanket, annular flow cross-section is for this purpose at least approximately inversely proportional to the mean diameter of the annular flow cross-section or to the mean distance of the flow cross-section from the axis of reaction zone and potential pot.

18. Fusion reactor according to claim 16 wherein the first heat exchanger gives up its heat to a potassium circuit passing through a second heat exchanger and a potassium turbine and the potassium turbine drives a first generator for generating electric energy.

19. Fusion reactor according to claim 18 wherein the second heat exchanger gives up its heat to a water/steam circuit passing through a steam turbine and a condenser and a pump and the steam turbine drives a second generator for generating electric energy.

20. Fusion reactor according to claim 1 comprising means for supplying reactants to the reaction zone and for discharging reaction products and excess reaction gas from the reaction zone, said means comprising at least one gas reservoir for gas to be supplied to the reaction zone, supply means with a supply channel coaxial to the axis of the reactor, for supplying reaction gas from at least one gas reservoir to the reaction zone, discharge means with a discharge channel coaxial to the axis of the reactor for carrying reaction products and excess reaction gas away from the reaction zone, a gas separating system for the gas coming from the reaction zone and a gas pump for conveying gas out of the reaction zone.

* * * * *